US009369890B2

(12) United States Patent
Nagata et al.

(10) Patent No.: US 9,369,890 B2
(45) Date of Patent: *Jun. 14, 2016

(54) RADIO COMMUNICATION SYSTEM, BASE STATION APPARATUS, MOBILE TERMINAL APPARATUS AND INTERFERENCE MEASUREMENT METHOD

(75) Inventors: Satoshi Nagata, Tokyo (JP); Yoshihisa Kishiyama, Tokyo (JP); Anass Benjebbour, Tokyo (JP); Wei Xi, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 22 days.

This patent is subject to a terminal disclaimer.

(21) Appl. No.: 14/355,320

(22) PCT Filed: Jul. 31, 2012

(86) PCT No.: PCT/JP2012/069506
§ 371 (c)(1),
(2), (4) Date: Apr. 30, 2014

(87) PCT Pub. No.: WO2013/069345
PCT Pub. Date: May 16, 2013

(65) Prior Publication Data
US 2014/0307576 A1   Oct. 16, 2014

(30) Foreign Application Priority Data

Nov. 7, 2011   (JP) ................................ 2011-244010
Jan. 30, 2012  (JP) ................................ 2012-017279

(51) Int. Cl.
*H04W 24/00* (2009.01)
*H04W 24/02* (2009.01)
(Continued)

(52) U.S. Cl.
CPC ............ *H04W 24/02* (2013.01); *H04B 17/345* (2015.01); *H04J 1/00* (2013.01); *H04J 11/00* (2013.01);*H04L 1/0001* (2013.01); *H04L 1/0027* (2013.01); *H04L 5/0051* (2013.01); *H04L 5/0094* (2013.01); *H04W 72/0473* (2013.01); *H04L 1/0026* (2013.01); *H04L 1/20* (2013.01)

(58) Field of Classification Search
None
See application file for complete search history.

(56) References Cited

U.S. PATENT DOCUMENTS

2010/0238818 A1* 9/2010 Takaoka et al. ............... 370/252
2011/0007657 A1* 1/2011 Kazmi et al. .................. 370/252
(Continued)

FOREIGN PATENT DOCUMENTS

| JP | 2008-288736 A | 11/2008 |
| JP | 2011-142406 A | 7/2011 |
| JP | 2011-142437 A | 7/2011 |

OTHER PUBLICATIONS

International Search Report for corresponding International Application No. PCT/JP2012/069506, mailed Nov. 6, 2012 (2 pages).
(Continued)

*Primary Examiner* — Chi H Pham
*Assistant Examiner* — Shick Hom
(74) *Attorney, Agent, or Firm* — Osha Liang LLP

(57) ABSTRACT

To increase the number of CSI-RSs for interference measurement to improve interference measurement accuracy, a first reference signal for channel state measurement and a second reference signal for interference measurement are assigned to reference signal resources defined for transmission of the first reference signal, and a mobile terminal apparatus that supports both the first reference signal and the second reference signal is notified of pattern information to identify an assignment pattern of the first reference signal and the second reference signal. A second mobile terminal apparatus that supports the first reference signal and that does not support the second reference signal is notified of pattern information to identify an assignment pattern of the first reference signal, and of assignment information indicating that resources assigned the second reference signal are assigned a third reference signal of zero power for channel state measurement.

8 Claims, 18 Drawing Sheets

(51) Int. Cl.
| | |
|---|---|
| *H04J 1/00* | (2006.01) |
| *H04J 11/00* | (2006.01) |
| *H04L 1/00* | (2006.01) |
| *H04L 5/00* | (2006.01) |
| *H04W 72/04* | (2009.01) |
| *H04B 17/345* | (2015.01) |
| *H04L 1/20* | (2006.01) |

(56) References Cited

U.S. PATENT DOCUMENTS

| | | | |
|---|---|---|---|
| 2011/0292903 A1* | 12/2011 | Jongren et al. | 370/329 |
| 2012/0213261 A1* | 8/2012 | Sayana et al. | 375/224 |
| 2012/0300652 A1 | 11/2012 | Kishiyama et al. | |
| 2012/0300653 A1 | 11/2012 | Kishiyama et al. | |
| 2013/0208677 A1* | 8/2013 | Lee et al. | 370/329 |
| 2015/0229452 A1* | 8/2015 | Nagata et al. | 370/252 |

OTHER PUBLICATIONS

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7);" Sep. 2006 (57 pages).

* cited by examiner

RADIO COMMUNICATION SYSTEM, BASE STATION APPARATUS, MOBILE TERMINAL APPARATUS AND INTERFERENCE MEASUREMENT METHOD

TECHNICAL FIELD

The present invention relates to a radio communication system, base station apparatus, mobile terminal apparatus and interference measurement method in the next-generation mobile communication system.

BACKGROUND ART

In UMTS (Universal Mobile Telecommunications System) networks, for the purpose of improving spectral efficiency and further improving data rates, by adopting HSDPA (High Speed Downlink Packet Access) and HSUPA (High Speed Uplink Packet Access), it is performed exploiting maximum features of the system based on W-CDMA (Wideband Code Division Multiple Access). For the UMTS network, for the purpose of further increasing high-speed data rates, providing low delay and the like, Long Term Evolution (LTE) has been studied (Non-patent Document 1).

In the 3G system, a fixed band of 5 MHz is substantially used, and it is possible to achieve transmission rates of approximately maximum 2 Mbps in downlink. Meanwhile, in the LTE system, using variable bands ranging from 1.4 MHz to 20 MHz, it is possible to achieve transmission rates of maximum 300 Mbps in downlink and about 75 Mbps in uplink. Further, in the UMTS network, for the purpose of further increasing the wide-band and high speed, successor systems to LTE have been studied (for example, may be called LTE Advanced or LTE Enhancement, (hereinafter, referred to as "LTE-A")).

In downlink of the LTE system (for example, Rel.8) is defined a CRS (Cell-specific Reference Signal) tied to a cell ID. The CRS is used in measurement of downlink channel quality (CQI: Channel Quality Indicator) for scheduling and adaptive control and the like, as well as being used in demodulation of user data. Meanwhile, in successor systems (for example, Rel.10) to LTE, a CSI-RS (Channel State Information-Reference Signal) is studied to be dedicated to CSI (Channel State Information) measurement.

CITATION LIST

Non-Patent Literature

[Non-patent literature 1] 3GPP, TR25.912 (V7.1.0), "Feasibility study for Evolved UTRA and UTRAN", September 2006

SUMMARY OF THE INVENTION

Technical Problem

In addition, in the case of measuring a CQI on the mobile terminal apparatus side, accuracy of interference measurement is important. In the LTE system, interference is measured using the CRS tied to a cell ID. However, in the case of a system configuration in which the same cell ID is assigned to a plurality of transmission points, such a defect exists that a user terminal is not able to divide CRSs that are transmitted at the same time from a plurality of transmission points assigned the same cell ID. Meanwhile, in LTE-A (Rel.10), with respect to the CSI-RS defined for signal component measurement of a reception signal (desired signal), it is possible to divide CSI-RSs also in the system configuration in which the same cell ID is assigned to a plurality of transmission points. However, in the case of measuring interference using the CSI-RS, since the density of the CSI-RS is low, it is difficult to measure interference with high accuracy.

The present invention was made in view of such a respect, and it is an object of the invention to provide a radio communication system, base station apparatus, mobile terminal apparatus and interference measurement method that enable interference to be measured with high accuracy in the future system which is not dependent on the CRS.

Solution to Problem

A radio communication system of the present invention is a radio communication system provided with a plurality of base station apparatuses that transmits a first reference signal for channel state measurement, and first and second mobile terminal apparatuses that connect to one of the plurality of base station apparatuses, where each of the base station apparatuses is provided with a reference signal assignment section that assigns the first reference signal to reference signal resources defined for transmission of the first reference signal, while assigning a second reference signal for interference measurement to the resources, and a notification section that notifies a first mobile terminal apparatus that supports both the first reference signal and the second reference signal of pattern information to identity an assignment pattern of the first reference signal and the second reference signal, and the first mobile terminal apparatus is provided with a reception section that receives notified pattern information, and an interference measurement section that performs interference measurement using both the first reference signal and the second reference signal or only the second reference signal for interference measurement, based on the notified pattern information.

Technical Advantage of the Invention

According to the present invention, since the first reference signal is assigned to reference signal resources defined for first reference signal transmission, while the second reference signal is assigned to the resources, it is possible to increase the density of the reference signal for interference measurement in reference signal resources for channel state measurement, and it is thereby possible to measure interference from another transmission point with high accuracy.

DESCRIPTION OF EMBODIMENTS

The CSI-RS that is one of reference signals adopted in successor systems (for example, Rel.10) to LTE will be described first with reference to FIG. 1. The CSI-RS is a reference signal used in CSI measurement of a CQI (Channel Quality Indicator), PMI (Precoding Matrix Indicator), RI (Rank Indicator) and the like as a channel state. Distinct from the CRS assigned to all subframes, the CSI-RS is assigned at predetermined intervals e.g. at 10-subframe intervals. Further, the CSI-RS is identified by parameters of a position, sequence and transmission power. The position of the CSI-RS includes a subframe offset, interval, and subcarrier-symbol offset (index).

In addition, defined as the CSI-RS are a non-zero power CSI-RS and a zero power CSI-RS. In the non-zero power CSI-RS, transmission power is allocated to resources to which the CSI-RS is assigned, and in the zero power CSI-RS, transmission power is not allocated to assigned resources (CSI-RS is muted.)

The CSI-RS is assigned in one resource block specified in LTE so as not to overlap control signals of the PDCCH (Physical Downlink Control Channel) and the like, user data of the PDSCH (Physical Downlink Shared Channel) and the like, and other reference signals such as the CRS (Cell-specific Reference signal) and DM-RS (Demodulation-Reference signal). One resource block is comprised of 12 subcarriers contiguous in the frequency domain and 14 symbols contiguous in the time-axis direction. From the viewpoint of suppressing the PAPR, resources capable of being assigned the CSI-RS are assigned a set of two resource elements adjacent in the time-axis direction.

In a CSI-RS arrangement configuration as shown in FIG. 1, 40 resource elements are reserved as CSI-RS resources (reference signal resources) in one resource block. The 40 resource elements are set for a CSI-RS pattern corresponding to the number of CSI-RS ports (the number of antennas, or the like). In each CSI-RS pattern, for one CSI-RS port, one resource element is assigned for the CSI-RS.

In the case where the number of CSI-RS ports is "2", the CSI-RS is assigned to 2 resource elements among 40 resource elements. Accordingly, in FIG. 1A, set is a CSI-RS pattern with 20 patterns shown by indexes #0 to #19 (CSI Configuration=0-19). Herein, for convenience in description, resource elements forming one pattern are assigned the same index.

In the case where the number of CSI-RS ports is "4", the CSI-RS is assigned to 4 resource elements among 40 resource elements. Accordingly, in FIG. 1B, set is a CSI-RS pattern with 10 patterns shown by indexes #0 to #9 (CSI Configuration=0-9). In addition, in the CSI-RS pattern, user data and the like are assigned to resource elements that are not assigned the CSI-RS.

Figure 1A:
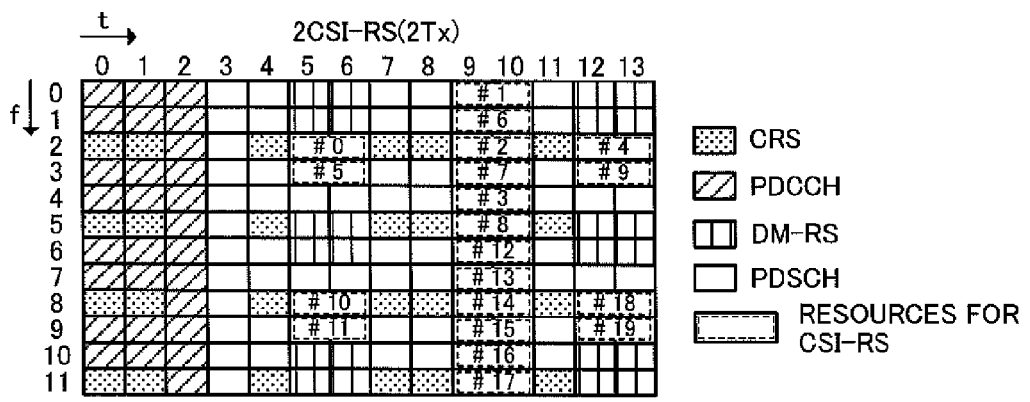
FIG. 1 contains explanatory diagrams of assignment patterns of CSI-RSs in resource blocks.
Figure 1B:
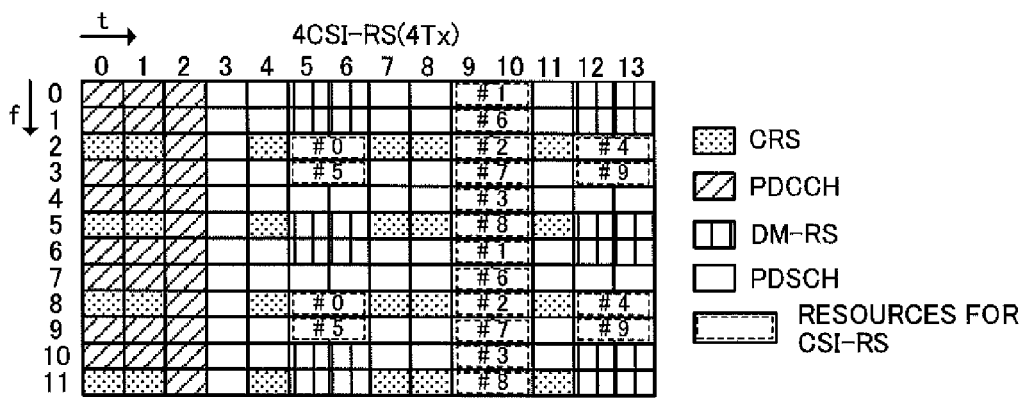
Figure 1C:
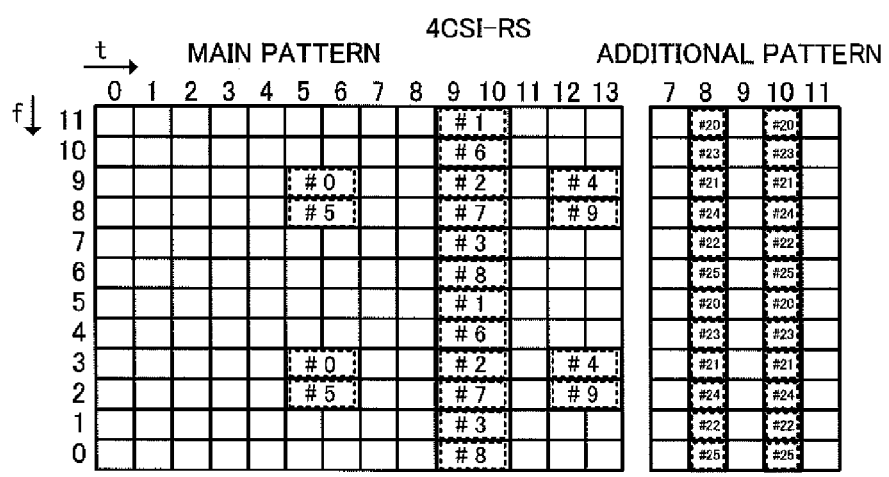

Then, in the CSI-RS, the CSI-RS pattern (CSI Configuration) varying with each cell is selected, and inter-cell interference is thereby suppressed. Further, in the CSI-RS pattern, as well as the normal patterns of FDD as shown in FIGS. 1A and 1B, an additional pattern of TDD may be added as an option of FDD as shown in FIG. 1C. Furthermore, it may be possible to have a CSI-RS pattern with the number of CSI-RS ports being "8". In the following description, for convenience in description, the normal patterns of FDD are exemplified to explain.

Figure 2A:
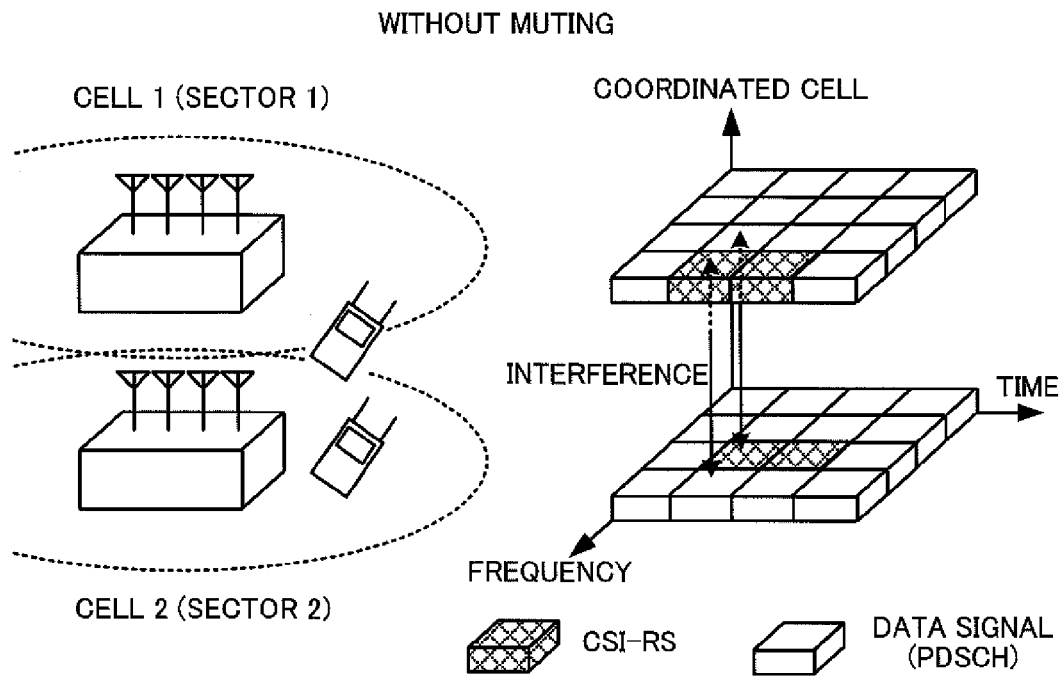
FIG. 2 contains explanatory diagrams of muting in CQI measurement using the CSI-RS.

In CSI measurement using this CSI-RS, there is the case where measurement accuracy deteriorates due to interference from an adjacent cell. For example, as shown in FIG. 2A, in a downlink resource block of a cell C1, user data is assigned corresponding to CSI-RSs of an adjacent cell C2. Further, in a downlink resource block of the cell C2, user data is assigned corresponding to CSI-RSs of the adjacent cell C1. These items of user data constitute an interference component of the CSI-RS in each cell, and become a factor of degrading measurement accuracy of CSI in a mobile terminal apparatus positioned on the boundary between the cell C1 and cell C2.

Figure 2B:
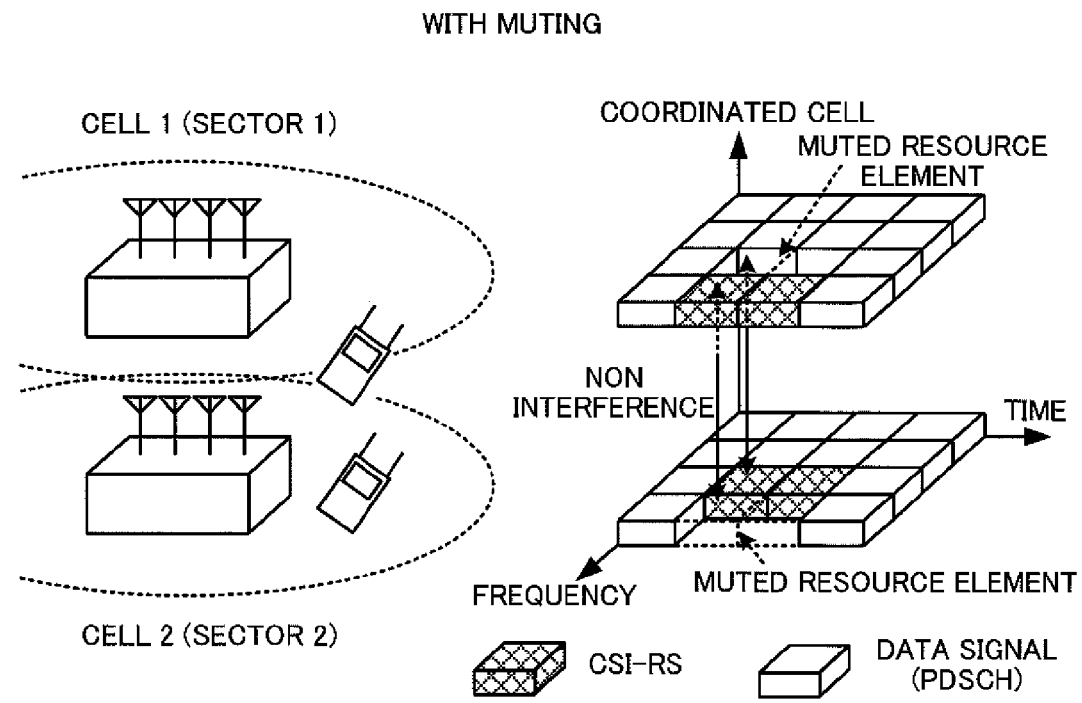

To improve deterioration in measurement accuracy of CSI caused by the assignment position of user data, it is possible to apply muting. In muting, as shown in FIG. 2B, user data is not assigned to resources corresponding to CSI-RSs of the adjacent cell. A downlink resource block of the cell C1 is subjected to muting corresponding to the CSI-RS of the cell C2. Further, a downlink resource block of the cell C2 is subjected to muting corresponding to the CSI-RS of the cell C1. By this configuration, the interference component of the CSI-RS caused by user data of the adjacent cell is eliminated, and measurement accuracy of CSI is improved in the mobile terminal apparatus. As well as the above-mentioned object, in the present invention, muting is performed to mask additional CSI-RSs for an existing mobile terminal.

In addition, a muted resource is a resource with transmission power of "0", but may be defined as a resource to which data is not assigned at all. Alternatively, the resource may be defined as a resource to which data is assigned to an extent that interference is not given to the CSI-RS of the adjacent cell. Depending on the case, the muted resource may be defined as a resource that is transmitted with transmission power of an extent that interference is not given to the CSI-RS of the adjacent cell.

In the case of calculating a CQI with the CSI-RS, accuracy of interference measurement is important. By using the CSI-RS that is a user-specific reference signal, since a user terminal is capable of dividing CSI-RSs from a plurality of transmission points, interference measurement on a CSI-RS base is promising. However, the CSI-RS defined in LTE (Rel.10) is low in the density in one resource block, and it is not possible to measure interference from another transmission point (another cell) with high accuracy.

In Aspect 1 of the present invention, interference from another transmission point is measured, using a high-density CSI-RS such that the CSI-RS density in a CSI-RS transmission resource is made higher than the density of the CSI-RS (hereinafter, referred to as an existing CSI-RS) defined in LTE (Rel.10).

By this means, it is possible to measure interference from transmission points except a transmission point connected to the user terminal with high accuracy. Further, it is possible to obtain the CSI using the high-density CSI-RS, and it is also possible to improve accuracy of the CSI. According to Aspect 1 of the invention, it is possible to improve both interference measurement accuracy and signal estimation accuracy.

Further, in downlink communications with a user terminal (hereinafter, referred to as an existing terminal (Rel.10)) that supports the existing CSI-RS of LTE (Rel.10) and that does not support the high-density CSI-RS, it is desirable to assign a zero power CSI-RS to a resource of an additional CSI-RS (additional CSI-RS added to the fixed pattern of CSI-RSs defined in Rel.10).

By this means, the existing terminal (Rel.10) recognizes the additional CSI-RS that is not supported as a zero power CSI-RS, and is capable of performing data demodulation with the additional CSI-RS resource omitted.

Described herein is an interference measurement method on a high-density CSI-RS base.

In the following description, the description is given using a system configuration, as an example, in which transmission points are a plurality of radio base stations assigned different cell IDs or the same cell ID.

Figure 3:
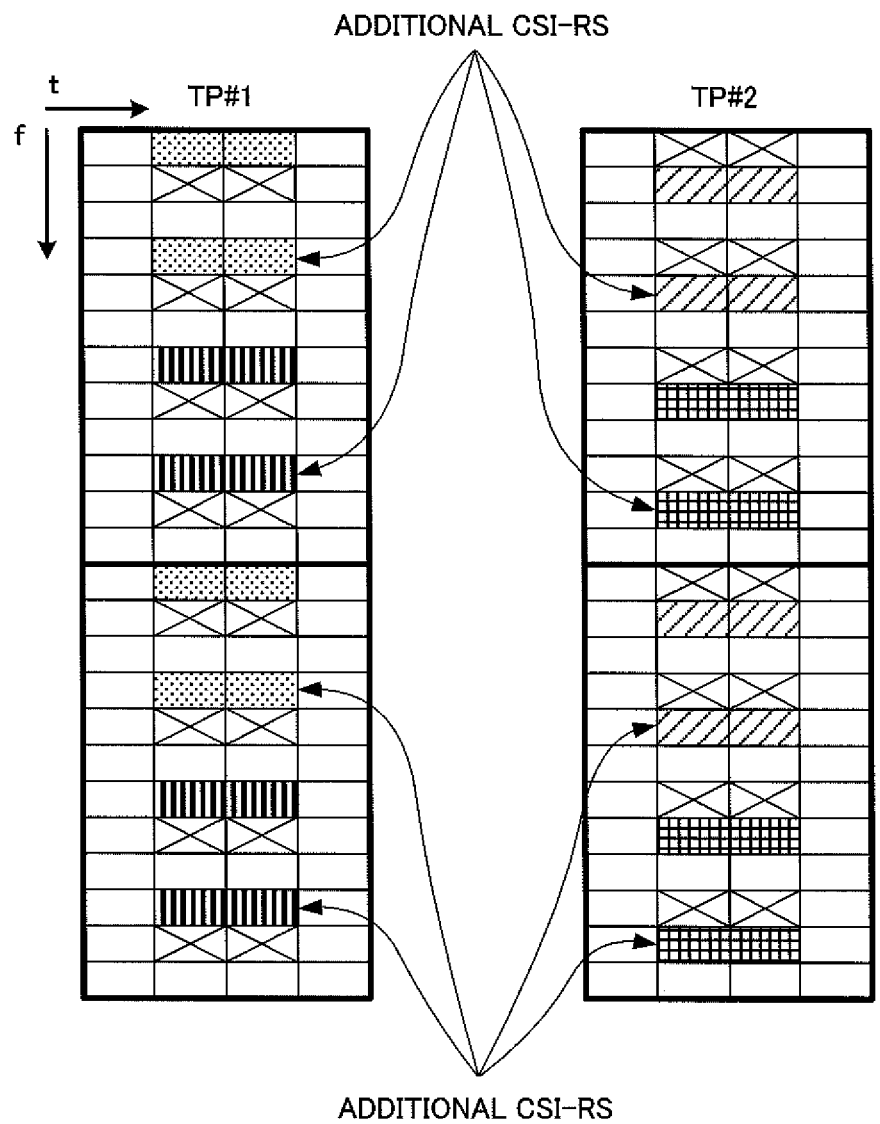
FIG. 3 is a diagram illustrating high-density CSI-RS patterns.
Figures 4A, 4B:
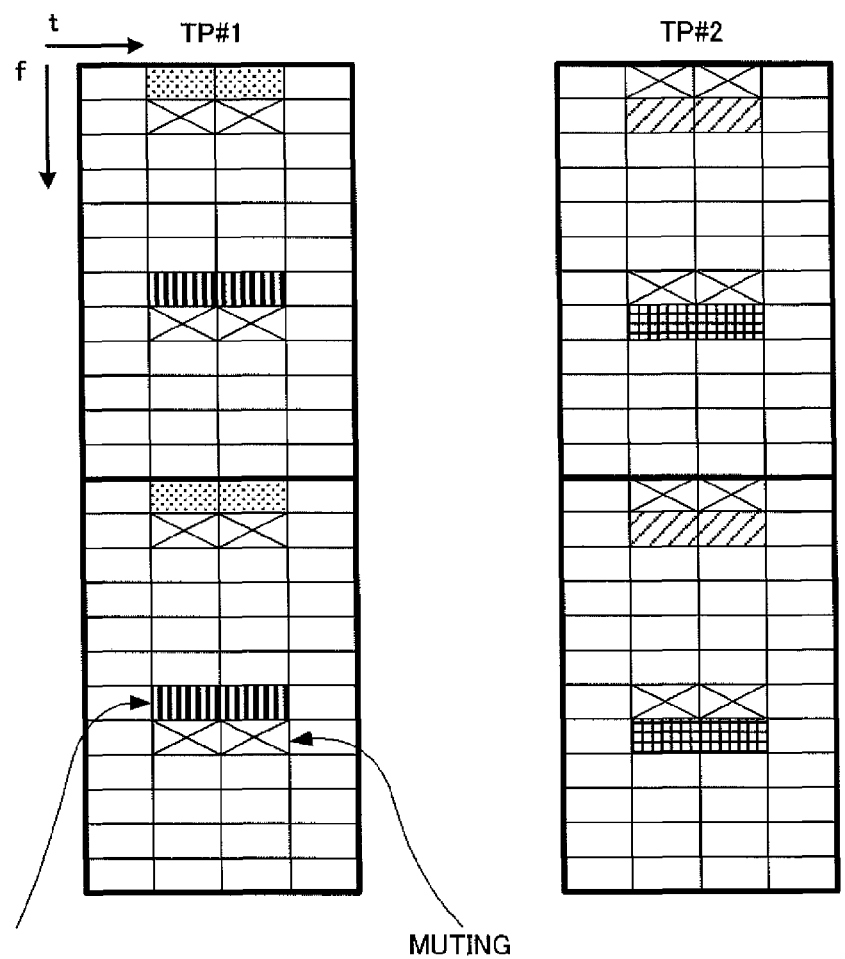
FIG. 4 contains existing CSI-RS patterns.

FIG. 3 shows one example of high-density CSI-RSs, where the 8th, 9th, 10th and 11th symbols as shown in FIG. 1A are extracted corresponding to 2 resource blocks. In addition, FIG. 4B shows a manner in which resource elements constituting CSI-RS resources in one resource block are numbered for convenience in description. In the following description, in the case of identifying a CSI-RS resource in one resource block, the resource number as shown in FIG. 4B is used as appropriate.

FIG. 3 shows high-density CSI-RS patterns applied to transmission points TP#1 and TP#2. In the high-density CSI-RSs applied to the transmission point TP#1, in one resource block, CSI-RSs (non-zero power CSI-RSs) are arranged in resource elements (1, 2), (7, 8), (13, 14) and (19, 20), and zero power CSI RSs are arranged in resource elements (3, 4), (9, 10), (15, 16) and (21, 22). As can be seen from comparison with the existing CSI-RS pattern in the transmission point TP#1 as shown in FIG. 4A, the high-density CSI-RSs are set at the density two times that of the fixed pattern (for example, for 2 antenna ports) of existing CSI-RSs as shown in FIG. 4A.

In the high-density CSI-RSs of the transmission point TP#2 as shown in FIG. 3, in one resource block, CSI-RSs (non-zero power CSI-RSs) are arranged in resource elements (3, 4), (9, 10), (15, 16) and (21, 22), and zero power CSI-RSs are arranged in resource elements (1, 2), (7, 8), (13, 14) and (19, 20).

In the example as shown in FIG. 3, the high-density CSI-RSs are orthogonalized in the time and frequency domains between the transmission point TP#1 and the transmission point TP#2.

The radio base station (TP#1) constituting the transmission point #1 notifies a terminal (hereinafter, referred to as a support terminal) that supports the high-density CSI-RSs among user terminals connected to the TP#1 of setting information of the high-density CSI-RSs as shown in FIG. 3 by higher layer signaling, and notifies the existing terminal (Rel.10) of setting information of the CSI-RSs as shown in FIG. 4 by higher layer signaling, while notifying of setting information of the zero power CSI-RSs in the additional CSI-RS resources by higher layer signaling.

The user terminal notified of the high-density CSI-RSs obtains CSI by channel state measurement using all high-density CSI-RSs transmitted from the transmission point of the connection destination, while measuring interference in high-density CSI-RS resources using high-density CSI-RSs transmitted from another transmission point. In addition, in the example as shown in FIG. 3, since the same resources as CSI-RS resources of the TP#1 are muted in the TP#2, it is possible to measure interference from another transmission point except the TP#2. Thus, since the number of CSI-RSs used in channel state measurement and interference measurement increases, it is possible to improve respective accuracy of channel state measurement and interference measurement.

Meanwhile, the existing terminal (Rel.10) recognizes that zero power CSI-RSs are set on additional CSI-RS resources, and omits the resources from demodulation.

As shown in FIG. 3, when the high-density CSI-RSs are completely orthogonalized in the time and frequency domains between the transmission point TP#1 and the transmission point TP#2, a user terminal connected to the transmission point TP#1 is capable of performing channel state measurement on a signal component of the CSI-RS without undergoing interference of the other transmission point TP#2.

In Aspect 2 of the present invention, in order to make the CSI-RS density in one resource block higher than the density defined in LTE (Rel.10), a CSI-RS pattern is applied in which interference measurement dedicated CSI-RSs that are CSI-RSs dedicated to interference measurement are added, and using the existing CSI-RSs and interference measurement dedicated CSI-RSs, a user terminal measures interference from another transmission point.

By this means, it is possible to measure interference using the existing CSI-RSs and interference measurement dedicated CSI-RSs, it is thus possible to increase the number of reference signals for interference measurement, and it is thereby possible to improve accuracy of interference measurement. As distinct from the existing CSI-RS, the interference measurement dedicated CSI-RS is capable of being arranged freely in resources that do not overlap the existing CSI-RS, unless the interference measurement dedicated CSI-RS is used in channel state measurement.

Described herein is an interference measurement method using the interference measurement dedicated CSI-RS.

As in the above-mentioned description, the description is given using the system configuration, as an example, in which two radio base stations are transmission points TP#1 and TP#2.

Figure 5:
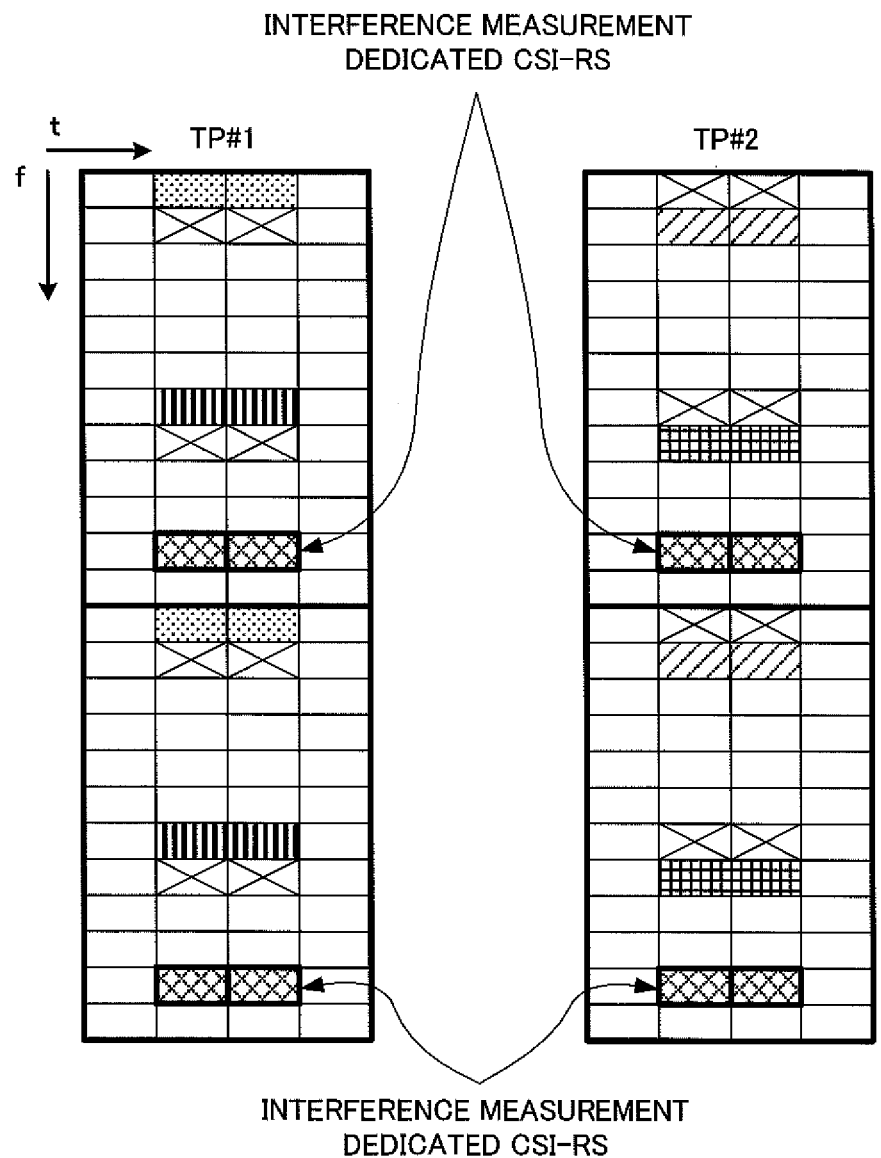
FIG. 5 is a diagram illustrating CSI-RS patterns including CSI-RSs dedicated to interference measurement.

FIG. 5 shows one example of CSI-RS patterns in which interference measurement dedicated CSI-RSs are added and arranged, where the 8th, 9th, 10th and 11th symbols as shown in FIG. 1A are extracted corresponding to 2 resource blocks.

In one resource block, the transmission point TP#1 places the interference measurement dedicated CSI-RS in resources (21, 22) that do not overlap the existing CSI-RSs (1, 2) and (13, 14). The interference measurement dedicated CSI-RS is not used in channel state measurement unlike the existing CSI-RS, and is capable of being arranged in resources that do not overlap the existing CSI-RS freely. In one resource block, the transmission point TP#2 places the interference measurement dedicated CSI-RS in resources (21, 22) that do not overlap the existing CSI-RSs (3, 4) and (15, 16).

In the example as shown in FIG. 5, interference measurement dedicated CSI-RSs are arranged in the same resources (21,22) between the transmission point TP#1 and the transmission point TP#2. When a signal sequence of the interference measurement dedicated CSI-RS is generated using a different scrambling sequence for a different transmission point or user terminal, even in the case where interference measurement dedicated CSI-RSs from a plurality of transmission points, TP#1 and TP#2, are combined, the user terminal is capable of performing code division. Further, the CSI-RS may be shifted in the frequency-axis direction so that resources of the interference measurement dedicated CSI-RSs do no overlap between the transmission points. In this case, by changing the number of shifts (the number of resource elements) of the interference measurement dedicated CSI-RS, it is possible to prevent the pattern of interference measurement dedicated CSI-RSs from overlapping between adjacent transmission points.

Thus, the interference measurement dedicated CSI-RSs are arranged in the same resources between a plurality of transmission points, TP#1 and TP#2, each transmission point transmits the interference measurement dedicated CSI-RSs with one antenna port, and it is thereby possible to decrease overhead of signaling. In addition, the present invention is not limited to the case where the interference measurement dedicated CSI-RSs are arranged in the same resources between transmission points. Further, the present invention is not limited to the case where the interference measurement dedicated CSI-RSs are transmitted with one antenna port.

The existing terminal (Rel.10) undergoes higher layer signaling with the interference measurement dedicated CSI-RS resources as zero power CSI-RSs.

The radio base station (TP#1) constituting the transmission point #1 notifies a support terminal that supports the interference measurement dedicated CSI-RS among user terminals connected to the TP#1 of setting information of the interference measurement dedicated CSI-RSs as shown in FIG. 5 by higher layer signaling, and notifies the existing terminal (Rel.10) of setting information of the existing CSI-RSs as shown in FIG. 4 by higher layer signaling, while performing higher layer signaling with resources (21, 22) of the interference measurement dedicated CSI-RS as the zero power CSI-RS.

Upon receiving notification of the interference measurement dedicated CSI-RS, the support terminal identifies interference measurement dedicated CSI-RS resources to receive, measures interference using both the interference measurement dedicated CSI-RS and the existing CSI-RS or using only the interference measurement dedicated CSI-RS resources, and measures the channel state using the existing CSI-RS. In interference measurement using the existing CSI-RS, the terminal divides into the CSI-RS transmitted from the transmission point TP#1 of the connection destination and the CSI-RS from another transmission point (another transmission point except the TP#2 in FIG. 5) to measure interference.

The existing terminal (Rel.10) is notified of the resources (21, 22) of the interference measurement dedicated CSI-RS as the zero power CSI-RS. As a result, the terminal recognizes that the resources in which the interference measurement dedicated CSI-RS is arranged as the zero power CSI-RS, and eliminates the interference measurement dedicated CSI-RS resources from data demodulation.

In Aspect 3 of the present invention, in order to make the density of CSI-RSs used in interference measurement in one resource block higher than the CSI-RS density defined in LTE (Rel.10), a pattern is applied in which zero power CSI-RSs (hereinafter, referred to as interference measurement zero power CSI-RSs) used only in interference measurement are added, and resources of the interference measurement zero power CSI-RS are shifted in the frequency-axis direction between transmission points so as not to overlap. By changing the number of shifts (the number of resource elements) of the interference measurement zero power CSI-RS, it is possible to prevent the pattern of interference measurement zero power CSI-RSs from overlapping between adjacent transmission points. A different interference measurement zero power CSI-RS pattern is assigned to each transmission point or every a plurality of transmission points.

By this means, it is possible to measure interference using both the non-zero power CSI-RS (existing CSI-RS with transmission power) and the interference measurement zero power CSI-RS, it is possible to increase the number of CSI-RSs available in interference measurement, and it is possible to improve interference measurement accuracy. Further, since transmission power of the interference measurement zero power CSI-RS is "0", it is possible to handle the signal component received in resources assigned the interference measurement zero power CSI-RS as an interference component without any processing, and it is possible to reduce a processing load for interference measurement.

Described herein is an interference measurement method using the interference measurement zero power CSI-RS.

The description is given using the system configuration, as an example, in which two radio base stations are transmission points TP#1 and TP#2.

Figure 6:
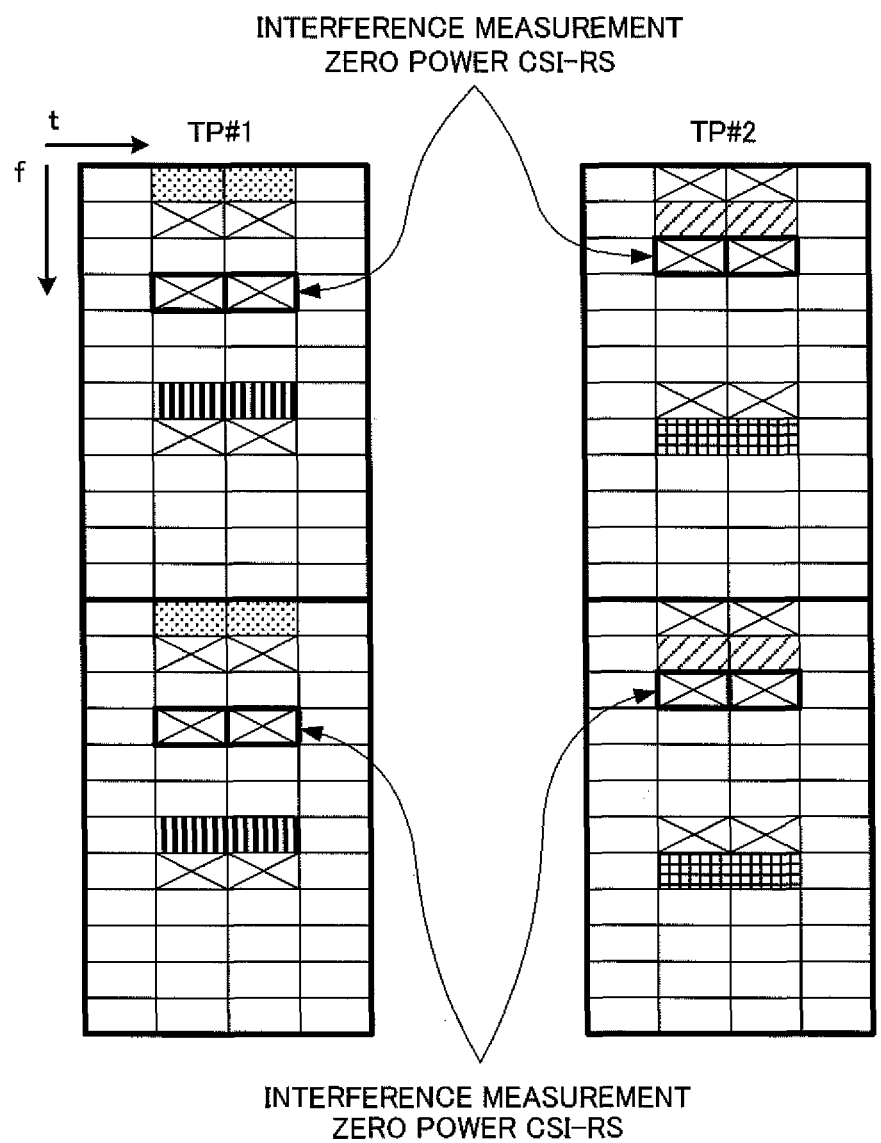
FIG. 6 is a diagram illustrating CSI-RS patterns including zero power CSI-RSs dedicated to interference measurement.

FIG. 6 shows one example of CSI-RS patterns in which interference measurement zero power CSI-RSs are added and arranged, where the 8th, 9th, 10th and 11th symbols as shown in FIG. 1A are extracted corresponding to 2 resource blocks.

In one resource block, the transmission point TP#1 places the interference measurement zero CSI-RS in resources (7, 8) that do not overlap the existing CSI-RSs (1, 2) (13, 14) according to a pattern 1. Based on the existing CSI-RS pattern, the interference measurement zero power CSI-RS is assigned to resource elements of two contiguous symbols with the same frequencies.

In one resource block, the transmission point TP#2 places the interference measurement zero CSI-RS in resources (5, 6) that do not overlap the existing CSI-RSs (3, 4) (15, 16) according to a pattern 2.

The patterns 1 and 2 are arbitrary patterns selected from among a plurality of patterns adjusted so that the interference measurement zero CSI-RSs do mutually not overlap. By changing the number of shifts (the number of resource elements) in the frequency domain of the interference measurement zero power CSI-RS, it is possible to generate patterns such that the interference measurement zero power CSI-RSs are orthogonalized in the time and frequency domains.

The radio base station (TP#1) constituting the transmission point #1 notifies a support terminal that supports the interference measurement zero power CSI-RS among user terminals connected to the TP#1 of setting information of the interference measurement zero power CSI-RSs as shown in FIG. 6 by higher layer signaling, and notifies the existing terminal (Rel.10) of setting information of the existing CSI-RSs as shown in FIG. 4 by higher layer signaling, while performing higher layer signaling with resources of the interference measurement zero power CSI-RS as the zero power CSI-RS.

The support terminal is notified of the interference measurement zero power CSI-RS. The support terminal measures interference from a signal received in resources of the notified interference measurement zero power CSI-RS. Since the interference measurement zero power CSI-RS is of zero power, the signal received in resources of the interference measurement zero power CSI-RS is an interference signal itself from the other transmission point TP#2. Further, the terminal measures the channel state using the existing CSI-RS. In interference measurement, in addition to interference measurement using the signal received in resources of the interference measurement zero power CSI-RS, interference may be measured using the existing CSI-RS. In interference measurement using the existing CSI-RS, the terminal divides into the CSI-RS transmitted from the transmission point TP#1 of the connection destination and the CSI-RS from another transmission point (another transmission point except the TP#2 in FIG. 5) to measure interference.

Meanwhile, the existing terminal (Rel.10) is notified of the resources allocated to the interference measurement zero power CSI-RS as the zero power CSI-RS. The existing terminal (Rel.10) eliminates the interference measurement zero power CSI-RS resources to demodulate the signal.

Figure 7:
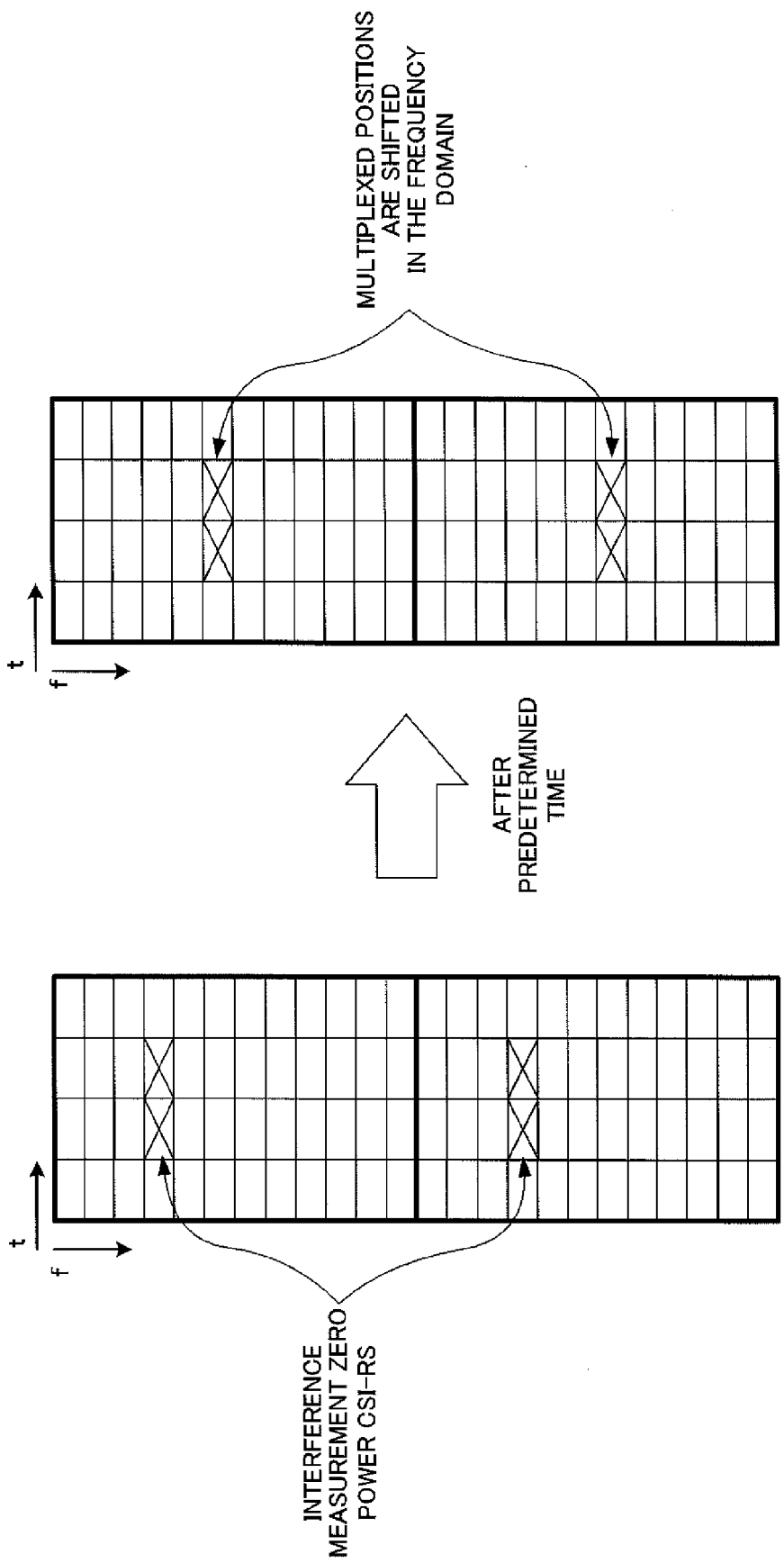
FIG. 7 is a diagram illustrating the case of changing a multiplexed position of zero power CSI-RSs dedicated to interference measurement.
Figure 8:
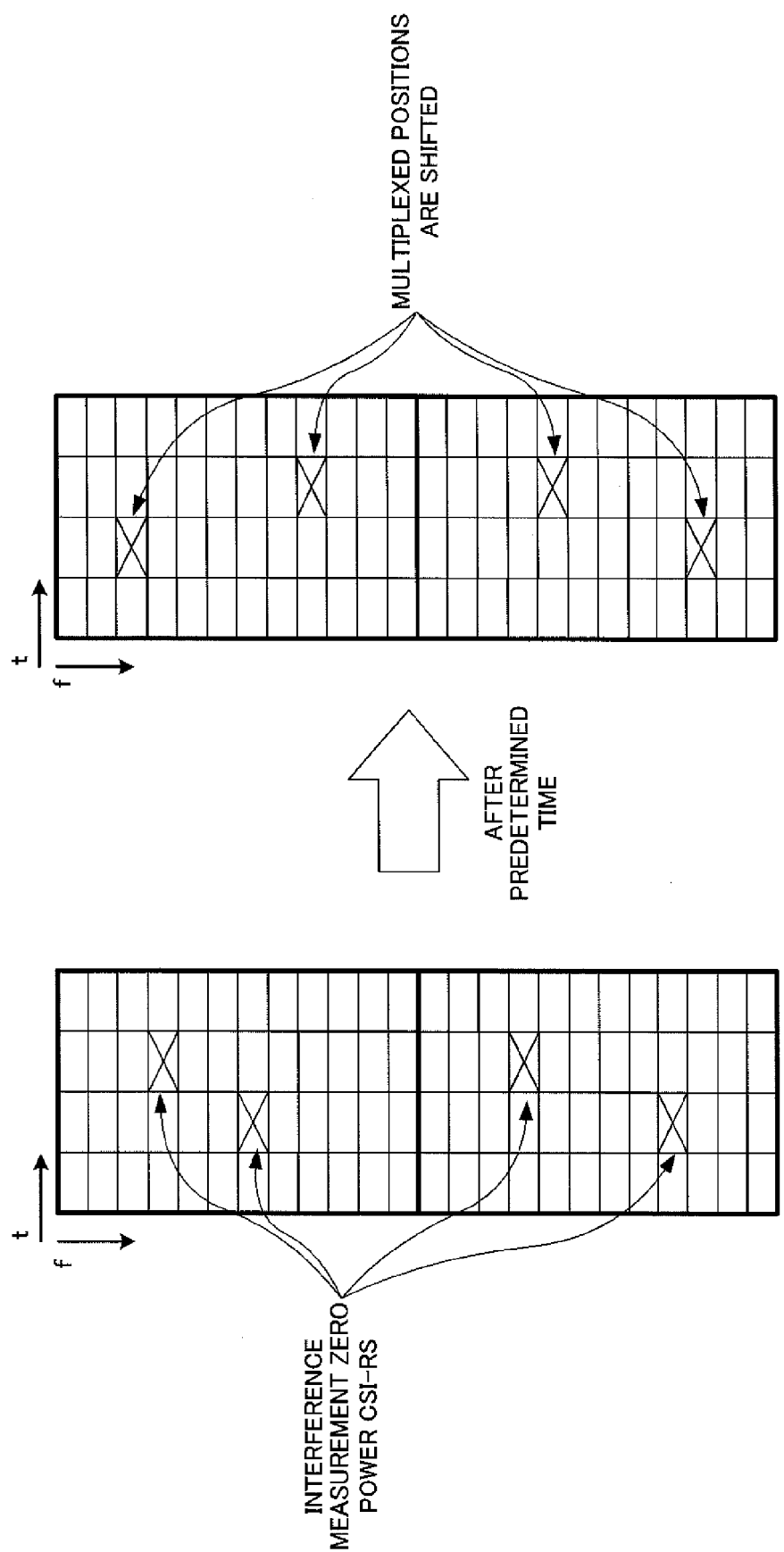
FIG. 8 is another diagram illustrating the case of changing a multiplexed position of zero power CSI-RSs dedicated to interference measurement.

In Aspect 4 of the present invention, applied is a pattern in which zero power CSI-RSs used in only interference measurement or CSI-RSs (hereinafter, respectively referred to as interference measurement zero power CSI-RSs and interference measurement CSI-RSs) are added, and as shown in FIGS. 7 and 8, in at least one of the time domain and the frequency domain, multiplexed positions of interference measurement zero power CSI-RSs or interference measurement CSI-RSs are changed. FIG. 7 shows the case where multiplexed positions of interference measurement zero power CSI-RSs are changed in the frequency domain, and FIG. 8 shows the case where multiplexed positions of interference measurement zero power CSI-RSs are changed in the time domain and the frequency domain. By this means, it is possible to increase the total number available as radio resources used in interference measurement.

In the case of changing multiplexed positions of interference measurement zero power CSI-RSs or interference measurement CSI-RSs in at least one domain of the time domain and the frequency domain, the multiplexed positions may be changed based on a beforehand determined pattern, or may be changed randomly. The frequency domain and time domain to change the multiplexed positions may be in a multiplexed region of existing CSI-RSs.

Further, a support terminal may be notified of the pattern to change multiplexed positions of interference measurement zero power CSI-RSs or interference measurement CSI-RSs. As a method of notifying the support terminal of the pattern to change multiplexed positions, a method may be used using higher layer signaling such as RRC signaling and broadcast signal, or a method may be used using control signals of the PDCCH, ePDCCH or the like.

In Aspect 5 of the present invention, interference measurement zero power CSI-RSs of a resource element unit used in only interference measurement or interference measurement CSI-RSs are randomly arranged (subjected to hopping), and a hopping pattern is changed in at least one domain of the time domain and the frequency domain. By this means, it is possible to increase the total number available as radio resources used in interference measurement.

In the case of changing a hopping pattern of interference measurement zero power CSI-RSs or interference measurement CSI-RSs in at least one domain of the time domain and the frequency domain, the multiplexed positions may be changed based on a beforehand determined pattern, or may be changed randomly. The frequency domain and time domain to change the multiplexed positions may be in a multiplexed region of existing CSI-RSs.

Further, a support terminal may be notified of the pattern to change the hopping pattern of interference measurement zero power CSI-RSs or interference measurement CSI-RSs. As a method of notifying the support terminal of the hopping pattern, a method may be used using higher layer signaling such as RRC signaling and broadcast signal, or a method may be used using control signals of the PDCCH ePDCCH or the like.

In Aspect 6 of the present invention, applied is a pattern in which CSI-RSs (hereinafter, referred to as interference measurement CSI-RSs) used in only interference measurement are added, and sequences of interference measurement CSI-RSs are changed in at least one domain of the time domain and the frequency domain. By this means, it is possible to increase the total number available as radio resources used in interference measurement.

In the case of changing the sequences of interference measurement CSI-RSs in at least one domain of the time domain and the frequency domain, the sequences may be changed based on a beforehand determined pattern, or may be changed randomly.

Further, a support terminal may be notified of the pattern to change the sequences of interference measurement CSI-RSs. As a method of notifying the support terminal of the pattern to change the sequences, a method may be used using higher layer signaling such as RRC signaling and broadcast signal, or a method may be used using control signals of the PDCCH, ePDCCH or the like.

In Aspect 7 of the present invention, interference measurement CSI-RSs of a resource element unit used in only interference measurement are randomly arranged (subjected to hopping), and a sequence is changed in at least one domain of the time domain and the frequency domain. By this means, it is possible to increase the total number available as radio resources used in interference measurement.

In the case of changing sequences of interference measurement CSI-RSs in at least one domain of the time domain and the frequency domain, the sequences may be changed based on a beforehand determined pattern, or may be changed randomly.

Further, a support terminal may be notified of the pattern to change the sequences of interference measurement CSI-RSs. As a method of notifying the support terminal of the pattern to change the sequences, a method may be used using higher layer signaling such as RRC signaling and broadcast signal, or a method may be used using control signals of the PDCCH, ePDCCH or the like.

In Aspect 8 of the present invention, in CSI-RS transmission resources, interference measurement zero power CSI-RSs (hereinafter, referred to as random holes) of a resource element unit are randomly arranged (subjected to hopping).

By this means, it is possible to increase the number of patterns of random holes (interference measurement zero power CSI-RSs of the resource element size). Further, it is possible to measure interference using both the existing CSI-RS (non-zero power CSI-RS) and the random hole (interference measurement zero power CSI-RS), the number of CSI-RSs available in interference measurement increases, and it is possible to improve interference measurement accuracy. Further, since transmission power of the random hole is "0", it is possible to handle the signal component received in interference measurement zero power CSI-RS resources as an interference component without any processing, and it is possible to reduce a processing load for interference measurement.

Described herein is an interference measurement method on a random hole base. The description is given using the system configuration, as an example, in which two radio base stations are transmission points TP#1 and TP#2.

Figure 9:
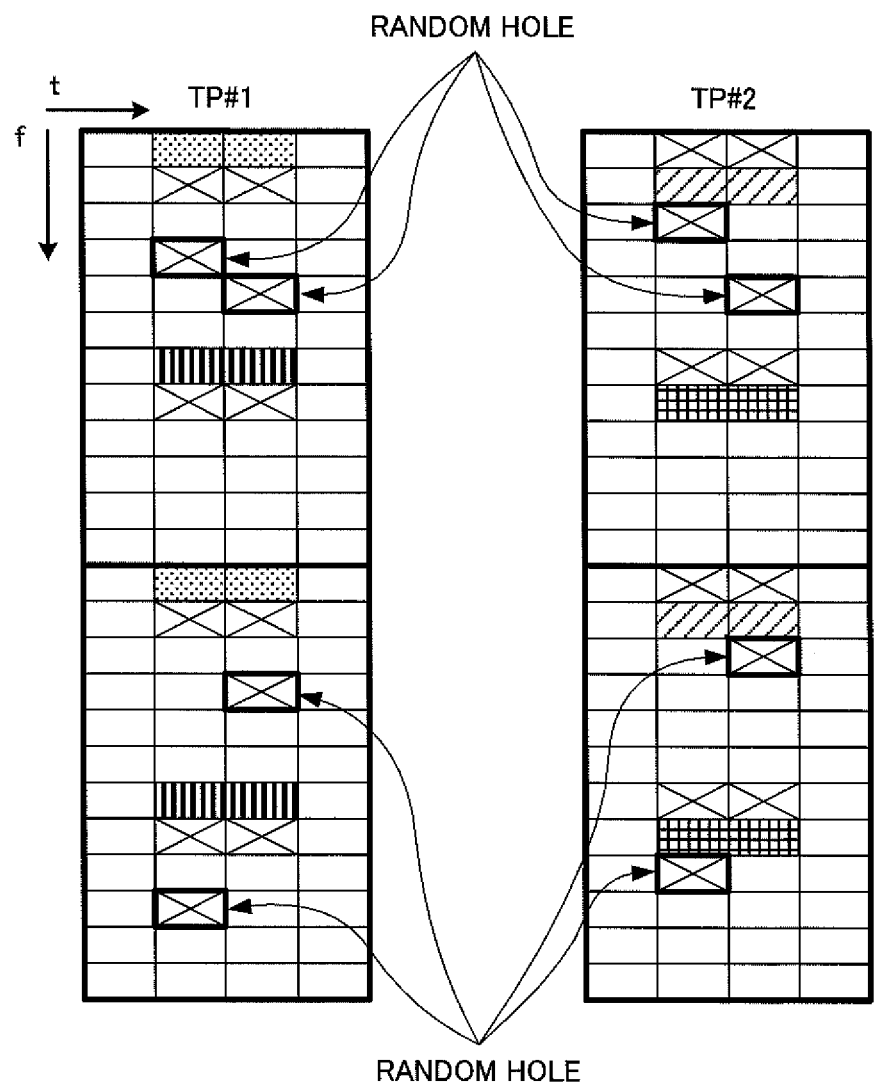
FIG. 9 is a diagram illustrating CSI-RS patterns including random holes.

FIG. 9 shows one example of CSI-RS patterns with random holes added, where the 8th, 9th, 10th and 11th symbols as shown in FIG. 1A are extracted corresponding to 2 resource blocks.

In the transmission TP#1, random holes are respectively arranged in a resource element (7) and another resource element (10) in an upper resource block, while being respectively arranged in a resource element (8) and another resource element (19) in a lower resource block. Among CRSI-RS transmission resources (in regions as shown in FIG. 9, resource elements 1 to 24), in regions except resource elements (1, 2) and (13, 14) in which existing CSI-RSs are arranged, random holes are arranged randomly according to a random pattern 1.

In the transmission TP#2, random holes are respectively arranged in a resource element (5) and another resource element (10) in an upper resource block, while being respectively arranged in a resource element (6) and another resource element (17) in a lower resource block. Among CRSI-RS transmission resources, in regions except resource elements (3, 4) and (15, 16) in which existing CSI-RSs are arranged, random holes are arranged randomly according to a random pattern 2.

In addition, the resource range in which random holes are randomized may be an arbitrary range. The random pattern 1 and random pattern 2 may not be adjusted so that random holes do not overlap each other. Further, the resource range to randomize may be limited to inside the CSI-RS pattern or zero power CSI-RS pattern. In one resource block as shown in FIG. 9, there are 20 resource elements in which random holes can be arranged (including zero power CSI-RSs). When it is assumed that randomizing is performed inside one resource block, there exist random patterns corresponding to the number of combinations obtained by selecting 2 resource elements from 20 resource elements. When randomizing is performed inside two resource block, there exist random patterns corresponding to the number of combinations obtained by selecting 4 resource elements from 40 resource elements.

The radio base station (TP#1) constituting the transmission point #1 notifies a support terminal that supports the interference measurement random hole among user terminals connected to the TP#1 of setting information of the random holes as shown in FIG. 9 by higher layer signaling, and notifies the existing terminal (Rel.10) of setting information of the existing CSI-RSs as shown in FIG. 4 by higher layer signaling, while notifying of the random holes as the zero power CSI-RSs by higher layer signaling. The signaling method of the random holes will be described later.

For example, the support terminal is notified of the random holes by using RRC signaling. The support terminal measures interference using the notified random hole, and measures the channel state using the existing CSI-RS. Further, in addition to interference measurement using the random hole, for interference measurement, interference measurement may be performed using the existing CSI-RS. Since the random hole is of zero power, the signal received in the interference measurement random hole is an interference signal itself from the other transmission point TP#2. Further, in interference measurement using the existing CSI-RS, the terminal divides into the CSI-RS transmitted from the transmission point TP#1 of the connection destination and the CSI-RS from another transmission point (another transmission point except the TP#2 in FIG. 9) to measure interference.

The existing terminal (Rel.10) is notified of the resources allocated to the random hole as the zero power CSI-RS. The existing terminal (Rel.10) eliminates the random hole to demodulate the signal.

In Aspect 9 of the present invention, in regions in which CRSI-RSs can be arranged, interference measurement power CSI-RSs (hereinafter, referred to as random CSI-RSs) of a resource element unit are randomly arranged (subjected to hopping). It is also understood that the random holes in above-mentioned Aspect 4 are replaced with non-zero power CSI-RSs.

Figure 10:
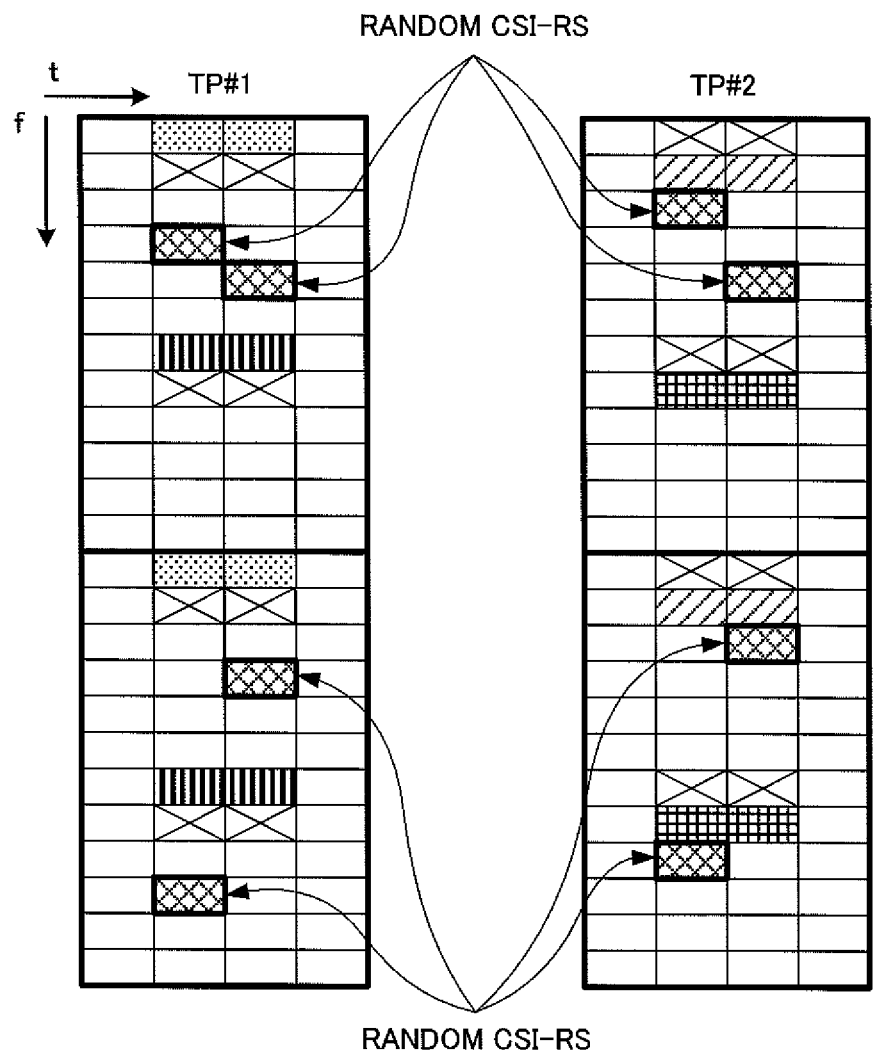
FIG. 10 is a diagram illustrating CSI-RS patterns including random CSI-RSs.

FIG. 10 shows one example of CSI-RS patterns in which random CSI-RSs are arranged, where the 8th, 9th, 10th and 11th symbols as shown in FIG. 1A are extracted corresponding to 2 resource blocks. As the random pattern, the same pattern as the CSI-RS pattern as shown in FIG. 9 is applied.

Thus, also in applying the interference measurement method on a random CSI-RS base, it is possible to increase the number of patterns available in interference measurement, and since the random CSI-RS is the non-zero power CSI-RS, it is possible to increase the number of reference signals for interference measurement. It is further possible to increase the number of reference signals for channel state measurement for the CSI.

In Aspect 10 of the present invention, the same interference measurement zero power CSI-RS pattern is used between transmission points. The interference measurement zero power CSI-RS is assigned to 2 resource elements formed from 2 contiguous symbols with the same frequencies, one random hole is assigned to one resource element of 2 resource elements in one of the transmission points, and one random hole is assigned to the other resource element of 2 resource elements in the other transmission point. The existing terminal (Rel.10) is notified of sets (2 resource elements) SET1, SET2 . . . of resource elements assigned the interference measurement zero power CSI-RS as the zero power CSI-RSs.

By this means, it is possible to notify the existing terminal (Rel.10) of the random hole (and the resource element adjacent to the random hole) using the existing pattern, and it is possible to prevent data demodulation accuracy from deteriorating.

Described herein is an interference measurement method on a same interference measurement zero power CSI-RS pattern base.

Figure 11:
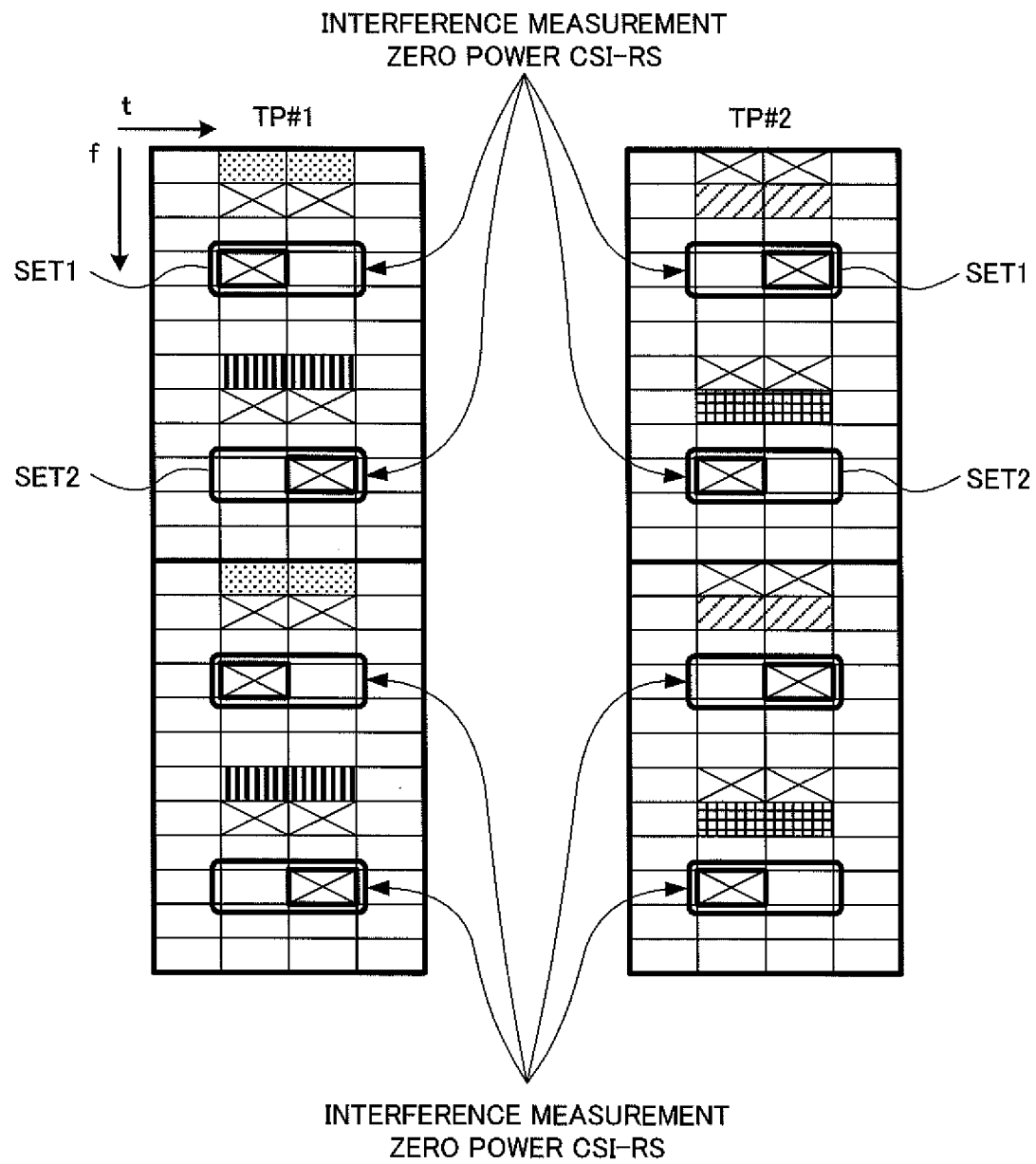
FIG. 11 is a diagram illustrating CSI-RS patterns including the same random holes between transmission points.

FIG. 11 shows one example of the same interference measurement zero power CSI-RS patterns, where the 8th, 9th, 10th and 11th symbols as shown in FIG. 1A are extracted corresponding to 2 resource blocks.

In the transmission TP#1, in one resource block, interference measurement zero power CSI-RSs are arranged in resource element sets SET1 (7, 8) and SET2 (19, 20), while in the resource element set SET1 (7, 8), the left-side element is designated as the random hole, and in the resource element set SET2 (19, 20), the right-side element is designated as the random hole.

In the transmission TP#2, interference measurement zero power CSI-RSs are arranged in the same pattern as in the transmission point TP#1. However, the positions of the random holes are orthogonalized (left-right arrangements are inverse) between transmission points. In other words, in one resource block, interference measurement zero power CSI-RSs are arranged in resource element sets SET1 (7, 8) and SET2 (19, 20), while in the resource element set SET1 (7, 8), the right-side element (8) is designated as the random hole, and in the resource element set SET2, the left-side element (19) is designated as the random hole.

The radio base station constituting the transmission point TP#1 notifies a support terminal connected to the TP#1 of the interference measurement zero power CSI-RS pattern as shown in FIG. 11 by higher layer signaling. The radio base station may further notify of the position (the left-side or right-side position in the resource element set SET) of the random hole by higher layer signaling, or may notify of only the position (the left-side or right side position in the resource element set SET) of the random hole by higher layer signaling. In this example, the radio base station notifies of the interference measurement zero power CSI-RS pattern information and the position information of the random hole.

Alternatively, as well as the arrangement pattern of interference measurement zero power CSI-RSs, a new pattern for identifying also the position of the random hole may be defined. The radio base station notifies the existing terminal (Rel.10) of setting information of the existing CSI-RSs as shown in FIG. 4 by higher layer signaling, while notifying of the interference measurement zero power CSI-RS as the zero power CSI-RS by higher layer signaling. The interference measurement zero power CSI-RS is based on the CSI-RS pattern (4 ports) defined in LTE-A (Rel.10) which is also used as signaling of the zero power CSI-RS.

By this means, also when the random hole of a resource element unit is set, the exiting terminal (Rel.10) is notified of risk resources having a possibility that correct demodulation cannot be performed by the supported signaling method, and it is thereby possible to prevent data demodulation accuracy from deteriorating.

In Aspect 11 of the present invention, the same interference measurement CSI-RS pattern is used between transmission points. In other words, the non-zero power CSI-RS dedicated to interference measurement is substituted for the random hole assigned to one of the resource elements of the interference measurement zero power CSI-RS in above-mentioned Aspect 10. The interference measurement dedicated CSI-RS is assigned to 2 resource elements formed from 2 contiguous symbols with the same frequencies. In one of the transmission points, one interference measurement dedicated CSI-RS is assigned to one resource element of 2 resource elements, and the other resource element is not assigned a reference signal. Further, in 2 resource elements assigned to the interference measurement dedicated CSI-RS, in the other transmission point, one interference measurement dedicated CSI-RS is assigned to the other resource element of 2 resource elements. The existing terminal (Rel.10) is notified of sets (2 resource elements) SET1, SET2 . . . of resource elements assigned the interference measurement zero power CSI-RS as the zero power CSI-RSs.

By this means, it is possible to notify the existing terminal (Rel.10) of the interference measurement dedicated CSI-RS (and the resource element adjacent to the interference measurement dedicated CSI-RS) using the existing pattern, and it is possible to prevent data demodulation accuracy from deteriorating.

In the CSI-RS patterns as shown in FIGS. 3, 5 and 6, the existing CSI-RS for interference measurement (FIG. 3), interference measurement dedicated CSI-RS (FIG. 5) and interference measurement zero power CSI-RS (FIG. 6) are added, and the added CSI-RSs adhere to the exiting CSI-RS pattern defined in LTE-A (Rel.10) without any modification (it is also said to reuse.) Accordingly, it is possible to perform signaling of resources to mute on the existing terminal (Rel.10) within the terminal capabilities (functions that the terminal supports).

Figure 13A:
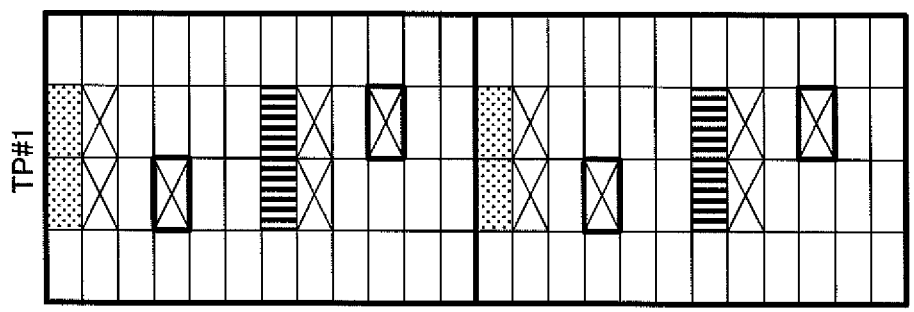
FIG. 13 contains diagrams illustrating CSI-RS patterns to explain a signaling method using a 16-bit bitmap.
Figure 13B:
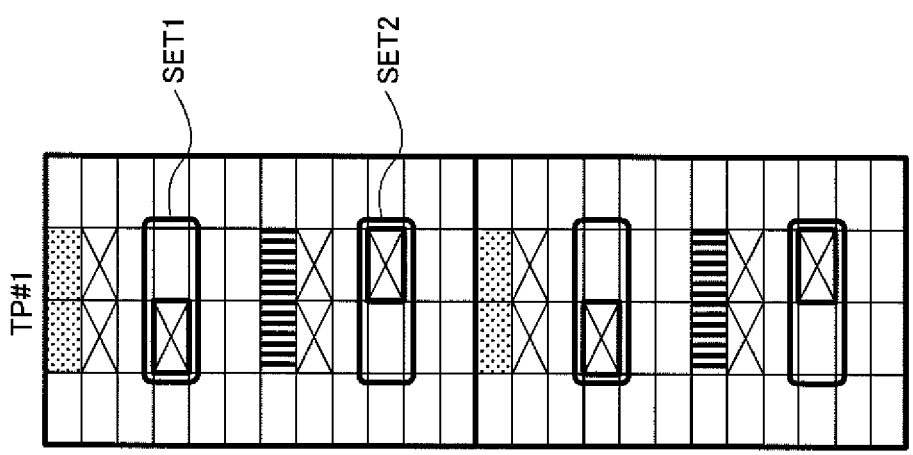

Meanwhile, the CSI-RS patterns as shown in FIGS. 9 and 10 are different from the existing CSI-RS pattern. Referring to FIGS. 13A and 13B, described are measures to reduce the effect on the existing terminal (Rel.10) in the case of applying the CSI-RS pattern different from the existing CSI-RS pattern (Re.10). As shown in FIG. 13A, in the case of applying the CSI-RS pattern with the random holes added, since the existing terminal (Rel.10) is not capable of recognizing the random holes from the existing CSI-RS pattern, data demodulation accuracy deteriorates in attempting to perform data demodulation including the random holes.

The signaling method of the zero power CSI-RS is defined in LTE-A (Rel.10). It is possible to use the above-mentioned signaling method to notify the existing terminal (Rel.10) of the random hole (or random CSI-RS) that the existing terminal (Rel.10) is not capable of supporting, and the adjacent resource element with the same frequencies that is the adjacent symbol of the random hole (or random CSI-RS). By this means, it is possible to notify the existing terminal (Rel.10) of the resource element having the possibility that correct demodulation cannot be performed.

Figure 12:
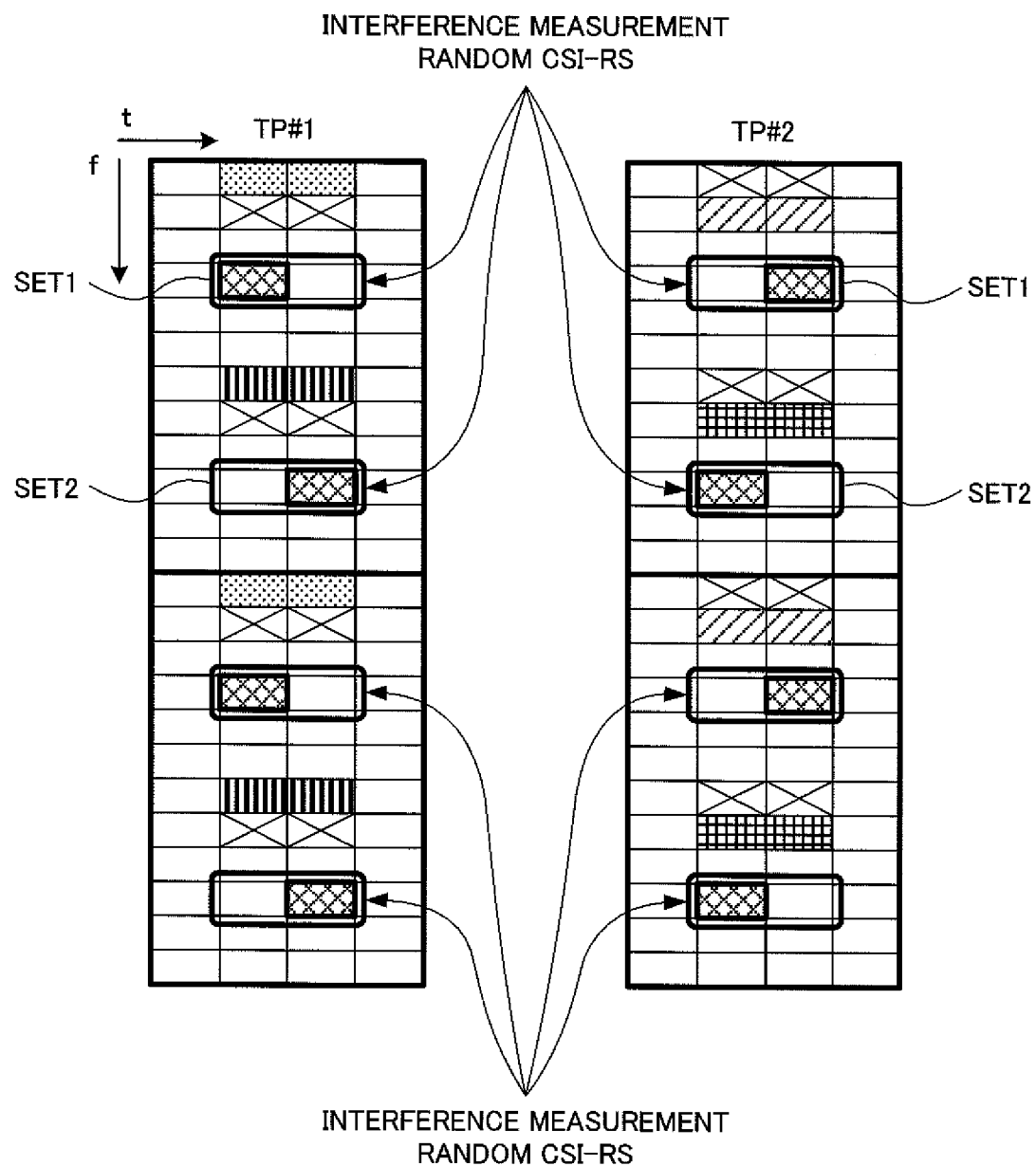
FIG. 12 is a diagram illustrating CSI-RS patterns including the same random CSI-RSs between transmission points.

In association with indexes [#0-#9, #20-#25] (CSI Configuration=0-9, 20-25) with the additional pattern of TDD added to the normal pattern of FDD as shown in FIG. 1C, the radio base station notifies the user terminal of 16-bit bitmap information. For example, as a basic pattern, in the case where zero power CSI-RSs are assigned to CSI-RS resources indicated by index #6, the user terminal is notified of bitmap information [0000001000000000]. In the bitmap information, "1" is set on a resource assigned the zero power CSI-RS, and "0" is set on a resource that is not muted. By 1 bit on the 16-bit bitmap, it is possible to indicate on/off of muting on 4 resource elements at the same time. In the example as shown in FIG. 11B, it is possible to switch off (mute) SET1 and SET2 at the same time, by bitmap information [0001000000000000] with "1" set on index #7. Further, as shown in FIGS. 11 and 12, it is effective in the case of applying the same interference measurement zero power CSI-RS pattern (FIG. 11) or interference measurement random CSI-RS pattern (FIG. 12) to a plurality of transmission points, TP#1 and TP#2. With attention directed toward the interference measurement zero power CSI-RS pattern as shown in FIG. 9, in the interference measurement zero power CSI-RS pattern applied to the TP#1, the interference measurement zero power CSI-RS is assigned to the left-side resource element inside the SET#1, and in the interference measurement zero power CSI-RS pattern applied to the TP#2, the interference measurement zero power CSI-RS is assigned to the right-side resource element inside the SET#1. Similarly, the same orthogonalization relationship is maintained in the SET#2 between the TP#1 and TP#2. It is possible to designate 4 resource elements by 1 bit in the 16-bit bitmap information, and it is thereby possible to cover both the transmission points TP#1 and TP#2 by the same interference measurement zero power CSI-RS pattern. By applying this existing signaling method, it is possible to notify of 4 resource elements and 8 resource elements (further, resource elements of multiples of "4") as the zero power CSI-RS.

As shown in FIG. 13B, the interference measurement zero power CSI-RS (resource element sets SET1, SET2 including the random hole) is defined based on the CSI-RS pattern used in the 16-bit bitmap information. By this means, the resource element sets SET1, SET2 including the random hole are made one pattern included in the existing CSI-RS pattern. Accordingly, when the resource element sets SET1, SET2 including the random hole are signaled to the existing terminal (Rel.10) as the zero power CSI-RS, the existing terminal (Rel.10) is capable of recognizing resource element sets SET1, SET2 including the random hole, and is capable of performing data demodulation while avoiding the resources.

Aspect 12 of the present invention is an interference measurement method obtained by combining any one of interference measurement methods of above-mentioned Aspect 1 to Aspect 11 and the existing (Rel.10) CRS, CSI-RS, zero power CSI-RS or data channel.

For example, when the support terminal performs interference measurement, the terminal may perform interference estimation using only the high-density CSI-RS, or may perform interference estimation by combining one of the existing CSI-RS, existing zero power CSI-RS, existing CRS and data channel, in addition to the high-density CSI-RS.

Further, when the support terminal performs interference measurement, the terminal may perform interference estimation using only the interference measurement dedicated CSI-RS, or may perform interference estimation by combining one of the existing CSI-RS, existing zero power CSI-RS, existing CRS and data channel, in addition to the interference measurement dedicated CSI-RS.

Furthermore, when the support terminal performs interference measurement, the terminal may perform interference estimation using only the interference measurement zero power CSI-RS, or may perform interference estimation by combining one of the existing CSI-RS, existing zero power CSI-RS, existing CRS and data channel, in addition to the interference measurement zero power CSI-RS.

Still furthermore, when the support terminal performs interference measurement, the terminal may perform interference estimation using only the random hole, or may perform interference estimation by combining one of the existing CST-RS, existing zero power CSI-RS, existing CRS and data channel, in addition to the random hole.

Moreover, when the support terminal performs interference measurement, the terminal may perform interference estimation using only the random CSI-RS, or may perform interference estimation by combining one of the existing CSI-RS, existing zero power CSI-RS, existing CRS and data channel, in addition to the random CSI-RS.

Further, when the support terminal performs interference measurement, the terminal may perform interference estimation using only the interference measurement zero power CSI-RS pattern, or may perform interference estimation by combining one of the existing CSI-RS, existing zero power CSI-RS existing CRS and data channel, in addition to the interference measurement zero power CSI-RS pattern.

Furthermore, when the support terminal performs interference measurement, the terminal may perform interference estimation using only the same interference measurement zero power CSI-RS among a plurality of transmission points, or may perform interference estimation by combining one of the existing CSI-RS, existing zero power CSI-RS, existing CRS and data channel, in addition to the interference measurement zero power CSI-RS pattern.

Still furthermore, when the support terminal performs interference measurement, the terminal may perform interference estimation using only the same interference measurement random CSI-RS among a plurality of transmission points, or may perform interference estimation by combining one of the existing CSI-RS, existing zero power CSI-RS, existing CRS and data channel, in addition to the interference measurement random CSI-RS pattern.

One example will be shown below in performing interference measurement using the interference measurement method of one of Aspect 1 to Aspect 11 and the existing CRS.

For example, considered is a system configuration in which two pico-cells (transmission points TP#2, TP#3) are located in a macro-cell (transmission point TP#1). It is assumed that the same cell ID is assigned to the macro-cell and two pico-cells. In such a system configuration, since the CRSs with the same cell ID are allocated to the same resources among three cells, a user terminal measures interference based on a CRS received from a cell except one virtual cell obtained by combining three cells. In other words, it is possible to measure interference received from the cell except the virtual cell, by performing interference measurement using the CRS.

Interference from the macro-cell and two pico-cells is measured by applying the interference measurement method of one of Aspect 1 to Aspect 11 using the CSI-RS. The CSI-RS is not dependent on the cell ID, and therefore, is capable of being divided on a cell-by-cell basis. Further, when a signal sequence of the CSI-RS is generated based on a signal sequence incorporating the user-specific identification information, even in the case where the signal is multiplexed into the same time/frequency resources, it is possible to extract by performing code division.

Figure 14:
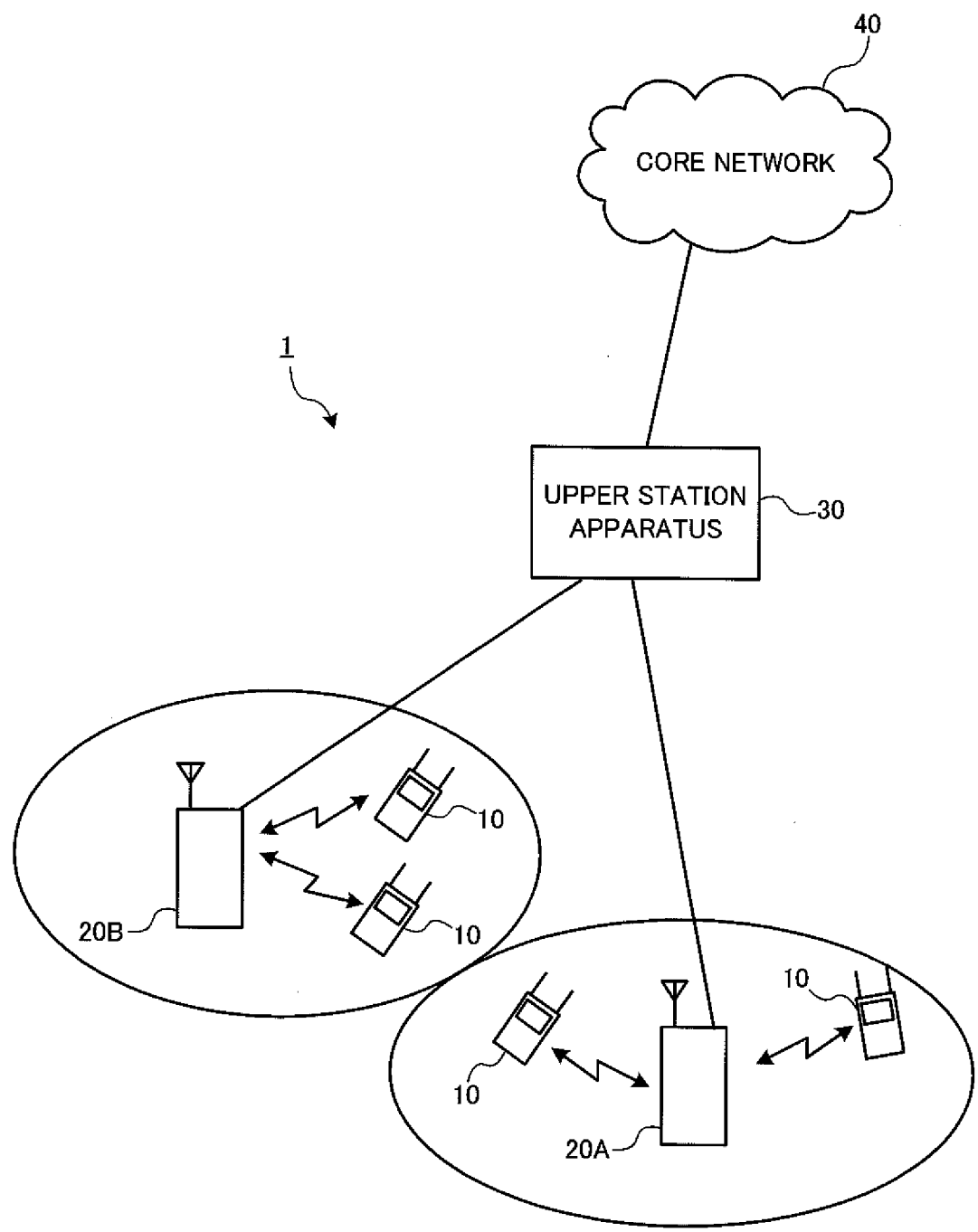
FIG. 14 is an explanatory diagram of a system configuration of a radio communication system.

Herein, a radio communication system according to the Embodiment of the present invention will specifically be described. FIG. 14 is an explanatory diagram of a system configuration of the radio communication system according to this Embodiment. In addition, the radio communication system as shown in FIG. 14 is a system including the LTE system or SUPER 3G, for example. In the radio communication system, used is carrier aggregation for integrating a plurality of base frequency blocks with a system band of the LTE system as a unit. Further, the radio communication system may be called IMT-Advanced or may be called 4G.

As shown in FIG. 14, the radio communication system 1 includes base station apparatuses 20A and 20B of respective transmission points, and mobile terminal apparatuses 10 that communicate with the base station apparatuses 20A and 20B, and is comprised thereof. The base station apparatuses 20A and 20B are connected to an upper station apparatus 30, and the upper station apparatus 30 is connected to a core network 40. Further, the base station apparatuses 20A and 20B are mutually connected by wired connection or wireless connection. The mobile communication terminal 10 is capable of communicating with the base station apparatuses 20A and 20B in transmission points #1 and #2. In addition, for example, the upper station apparatus includes an access gateway apparatus, radio network controller (RNC), mobility management entity (MME), etc., but is not limited thereto.

The mobile terminal apparatus 10 includes the existing terminal (Rel.10) and support terminals (for example, Rel.11), and is described as the mobile terminal apparatus to proceed with the explanation unless otherwise specified in the following description. Further, for convenience in description, the description is given while assuming that equipments that perform radio communications with the base station apparatuses 20A and 20B are the mobile terminal apparatuses 10, and more generally, the equipments may be user equipments (UEs) including mobile terminal apparatuses and fixed terminal apparatuses.

In the radio communication system 1, as a radio access scheme, OFDMA (Orthogonal Frequency Division Multiple Access) is applied in downlink, while SC-FDMA (Single Carrier-Frequency Division Multiple Access) is applied in uplink, and the uplink radio access scheme is not limited thereto. OFDMA is a multicarrier transmission scheme for dividing a frequency band into a plurality of narrow frequency bands (subcarriers), and mapping data to each subcarrier to perform communications. SC-FDMA is a single-carrier transmission scheme for dividing the system band into bands comprised of a single or consecutive resource blocks for each terminal so that a plurality of terminals uses mutually different bands, and thereby reducing interference among the terminals.

Described herein are communication channels.

The downlink communication channels have the PDSCH (Physical Downlink Shared Channel) as a downlink data channel shared among the mobile terminal apparatuses 10, and downlink L1/L2 control channels (PDCCH, PCFICH, PHICH). Transmission data and higher control information is transmitted on the PDSCH. Scheduling information of the PDSCH and PUSCH and the like is transmitted on the PDCCH (Physical Downlink Control Channel). The number of OFDM symbols used in the PDCCH is transmitted on the PCFICH (Physical Control Format Indicator Channel). ACK/NACK of HARQ to the PUSCH is transmitted on the PHICH (Physical Hybrid-ARQ Indicator Channel).

The uplink communication channels have the PUSCH (Physical Uplink Shared Channel) as an uplink data channel shared among the mobile terminal apparatuses, and the PUCCH (Physical Uplink Control Channel) that is a control channel in uplink. Transmission data and higher control information is transmitted on the PUSCH. Further, on the PUCCH is transmitted downlink radio quality information (CQI: Channel Quality Indicator), ACK/NACK and the like.

Figure 15:
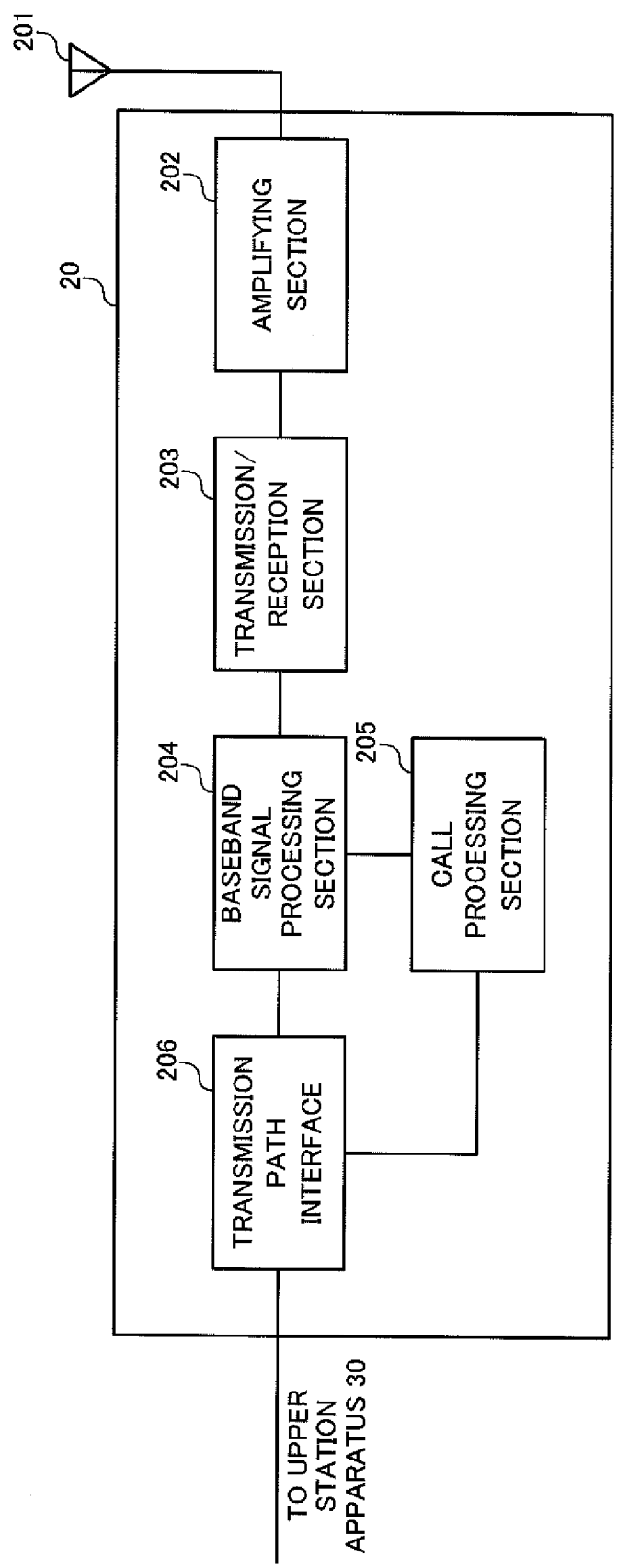
FIG. 15 is an explanatory diagram of an entire configuration of a base station apparatus.

Referring to FIG. 15, described is the entire configuration of the base station apparatus according to this Embodiment. In addition, the base station apparatuses 20A and 20B have the same configuration, and therefore, are described as the base station apparatus 20. The base station apparatus 20 is provided with a transmission/reception antenna 201, amplifying section 202, transmission/reception section (notification section) 203, baseband signal processing section 204, call processing section 205 and transmission path interface 206. The transmission data to transmit from the base station apparatus 20 to the mobile terminal apparatus in downlink is input to the baseband signal processing section 204 via the transmission path interface 206 from the upper station apparatus 30.

The baseband signal processing section 204 performs, on the downlink data channel signal, PDCP layer processing, segmentation and concatenation of the transmission data, RLC (Radio Link Control) layer transmission processing such as transmission processing of RLC retransmission control, MAC (Medium Access Control) retransmission control e.g. HARQ transmission processing, scheduling, transmission format selection, channel coding, Inverse Fast Fourier Transform (IFFT) processing and precoding processing. Further, on a signal of the Physical Downlink Control Channel that is a downlink control channel, the section 204 also performs transmission processing of channel coding, Inverse Fast Fourier Transform and the like.

Further, the baseband signal processing section 204 notifies mobile terminal apparatuses 10 connected to the same transmission point of control information for each mobile terminal apparatus 10 to perform radio communications with the base station apparatus 20 on the broadcast channel. For example, the information for communications in the transmission point includes the system bandwidth in uplink or downlink, identification information (Root Sequence Index) of a root sequence to generate a signal of a random access preamble on the PRACH (Physical Random Access Channel), etc.

The transmission/reception section 203 converts the frequency of the baseband signal output from the baseband signal processing section 204 into a radio frequency band. The amplifying section 202 amplifies a radio frequency signal subjected to frequency conversion to output to the transmission/reception antenna 201.

Meanwhile, with respect to signals transmitted from the mobile terminal apparatus 10 to the base station apparatus 20 in uplink, a radio frequency signal received in the transmission/reception antenna 201 is amplified in the amplifying section 202, subjected to frequency conversion in the transmission/reception section 203, thereby converted into a baseband signal, and is input to the baseband signal processing section 204.

The baseband signal processing section 204 performs FFT processing, IDFT processing, error correcting decoding, reception processing of MAC retransmission control, and reception processing of RLC layer and PDCP layer on transmission data included in the baseband signal received in uplink. The decoded signal is transferred to the upper station apparatus 30 via the transmission path interface 206.

The call processing section 205 performs call processing such as setting and release of the communication channel, status management of the base station apparatus 20, and management of radio resources.

The entire configuration of the mobile terminal apparatus according to this Embodiment will be described next with reference to FIG. 16. The mobile terminal apparatus 10 is provided with a transmission/reception antenna 101, amplifying section 102, transmission/reception section (reception section) 103, baseband signal processing section 104 and application section 105.

With respect to data in downlink, a radio frequency signal received in the transmission/reception antenna 101 is amplified in the amplifying section 102, subjected to frequency conversion in the transmission/reception section 103, and is converted into a baseband signal. The baseband signal is subjected to FFT processing, error correcting decoding, reception processing of retransmission control, etc. in the baseband signal processing section 104. Among the data in downlink, the transmission data in downlink is transferred to the application section 105. The application section 105 performs processing concerning layers higher than the physical layer and MAC layer and the like. Further, among the data in downlink, the broadcast information is also transferred to the application section 105.

Meanwhile, with respect to transmission data in uplink, the application section 105 inputs the data to the baseband signal processing section 104. The baseband signal processing section 104 performs mapping processing, transmission processing of retransmission control (HARQ), channel coding, DFT processing and IFFT processing. The transmission/reception section 103 converts the frequency of the baseband signal output from the baseband signal processing section 104 into a radio frequency band. Then, the amplifying section 102 amplifies the radio frequency signal subjected to frequency conversion to transmit from the transmission/reception antenna 101.

Figure 17:
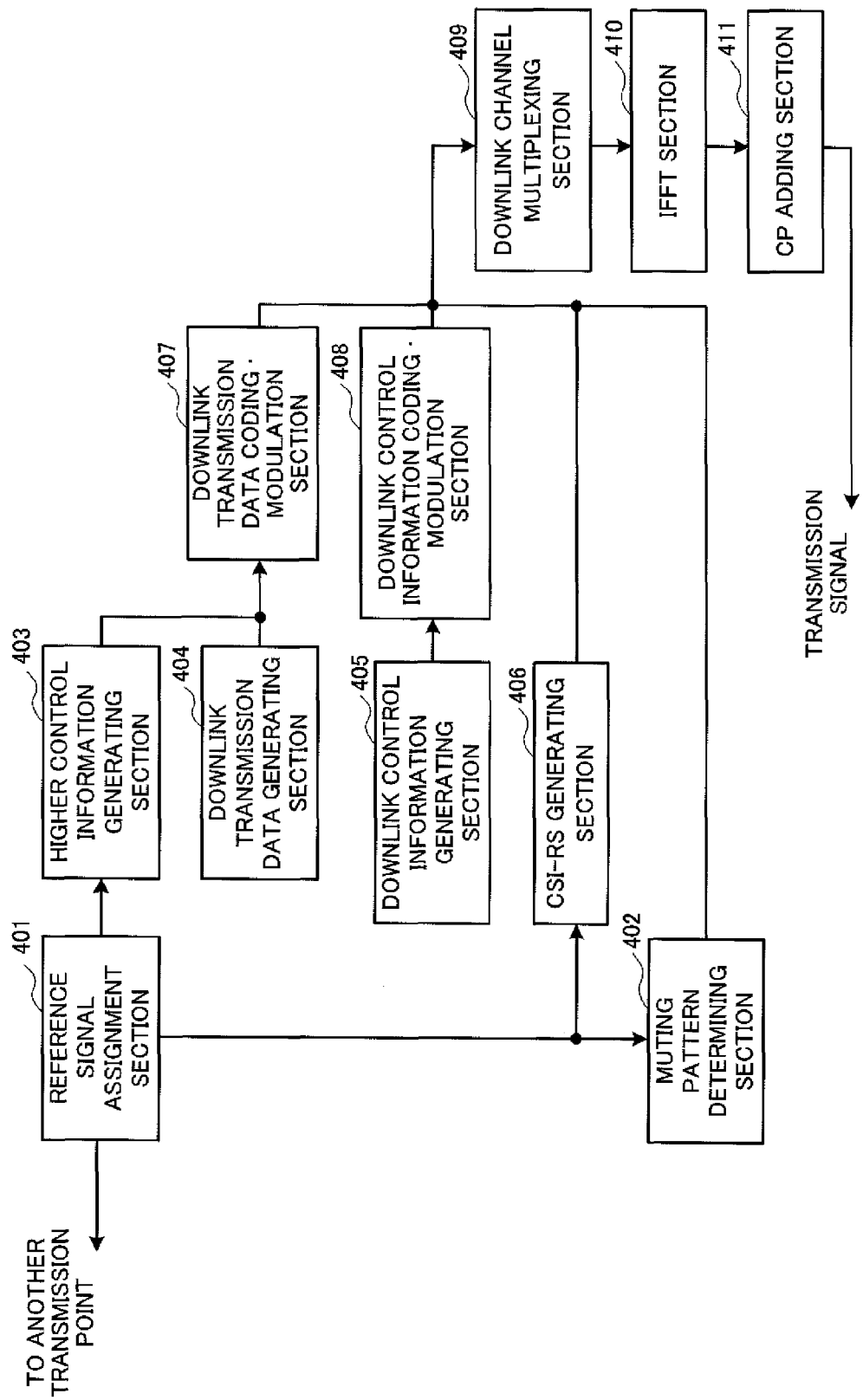
FIG. 17 is a functional block diagram of the base station apparatus.

Functional blocks of the base station apparatus associated with CSI-RS pattern determination processing will be described with reference to FIG. 17. In addition, each functional block of FIG. 17 is mainly related to the baseband processing section as shown in FIG. 15. Further, the functional block diagram of FIG. 17 is simplified to describe the present invention, and is assumed to have the configuration that the baseband processing section usually has.

On the transmission side, the base station apparatus 20 is provided with a reference signal assignment section 401, muting pattern determining section 402, higher control information generating section 403, downlink transmission data generating section 404, downlink control information generating section 405, CSI-RS generating section 406, downlink transmission data coding•modulation section 407, and downlink control information coding•modulation section 408. Further, the base station apparatus 20 is provided with a downlink channel multiplexing section 409, IFFT section 410 and CP adding section 411.

Based on the CSI-RS pattern as shown in one of FIGS. 3, 5, 6, 9 and 10, the reference signal assignment section 401 assigns additional CSI-RSs (one of the interference measurement dedicated CSI-RS, interference measurement zero power CSI-RS, random hole and random CSI-RS) to CSI-RS resources. The assignment information of the CSI-RS pattern including the additional CSI-RSs is conveyed to the higher control information generating section 403 to perform higher layer signaling (for example, RRC signaling) to a mobile terminal apparatus that is the support terminal, and further, is conveyed to the CSI-RS generating section 406 to generate CSI-RSs. Moreover, the assignment information (that may be in bitmap form) of zero power CSI-RSs to notify the mobile terminal apparatus is notified to the muting pattern determining section 402. The reference signal assignment section 401 assigns the zero power CSI-RSs to mask the additional CSI-RSs to the existing terminal (Rel.10). The section 401 assigns the zero power CSI-RSs defined for channel state measurement to the support terminal. The assigned zero power CSI-RS pattern may be called the muting information.

The muting pattern determining section 402 determines a muting pattern based on the assignment information of the zero power CSI-RSs. The muting pattern determining section 402 uses muting patterns based on the CSI-RS pattern that the existing terminal (Rel.10) supports. The additional CSI-RSs (CSI-RS for both channel state measurement and interference measurement, interference measurement dedicated CSI-RS and interference measurement zero power CSI-RS) as shown in FIGS. 3, 5 and 6 are based on muting patterns based on the CSI-RS pattern that the existing terminal (Rel.10) supports. However, the additional CSI-RSs (random hole and random CSI-RS) as shown in FIGS. 9 and 10 are not based on the CSI-RS pattern that the existing terminal (Rel.10) supports. Therefore, as shown in FIGS. 11 and 13B, the random hole or random CSI-RS is packaged as the resource element set SET1 or SET2 each comprised of 2 resource elements. By this means, based on the CSI-RS pattern that the existing terminal (Rel.10) supports, it is possible to signal additional CSI-RS resources as the zero power CSI-RS.

The higher control information generating section 403 generates higher control information that is transmitted and received by higher layer signaling (for example, RRC signaling), and outputs the generated higher control information to the downlink transmission data coding•modulation section 407. The higher control information generating section 403 generates higher control information including the assignment pattern information of CSI-RSs that is output from the reference signal assignment section 401. More specifically, the section 403 generates higher control information to notify the support terminal of assignment information of the CSI-RS pattern including additional CSI-RSs. In the case of notifying of the interference measurement zero power CSI-RSs included in the CSI-RS pattern as shown in FIG. 9, the section 403 adds, to the higher control information, bit information indicative of one of the left side and right side assigned the random hole between 2 resource elements assigned the interference measurement zero power CSI-RS. In addition, the case where the CSI-RS pattern as shown in FIG. 11 is newly defined is not limited thereto.

The downlink transmission data generating section 404 generates transmission data in downlink, and outputs the downlink transmission data to the downlink transmission data coding•modulation section 407.

The downlink control information generating section 405 generates control information in downlink, and outputs the downlink control information to the downlink control information coding•modulation section 408. The downlink transmission data coding•modulation section 407 performs channel coding and data modulation on the downlink transmission data and the higher control information to output to the downlink channel multiplexing section 409. The downlink control information coding•modulation section 408 performs channel coding and data modulation on the downlink control information to output to the downlink channel multiplexing section 409.

The CSI-RS generating section 406 generates CSI-RSs, and outputs the CSI-RSs to the downlink channel multiplexing section 409. As shown in FIGS. 3, 5 and 10, in the case where additional CSI-RSs are non-zero power CSI-RSs, the CSI-RS generating section 406 allocates the additional CSI-RSs together with existing CSI-RSs according to CSI-RS assignment pattern information. Meanwhile, as shown in FIGS. 6, 9 and 11, in the case where the additional CSI-RSs are zero power CSI-RSs, the CSI-RS generating section 406 does not perform allocation of transmission power to resources of the additional CSI-RSs.

The downlink channel multiplexing section 409 combines the downlink control information, CSI-RSs (including additional CSI-RSs), higher control information and downlink transmission data to generate a transmission signal. In this case, the downlink channel multiplexing section 409 multiplexes the downlink transmission data so as to avoid setting positions of muting determined in the muting pattern determining section 402. The downlink channel multiplexing section 409 outputs the generated transmission signal to the IFFT section 410. The IFFT section 410 performs Inverse Fast Fourier Transform on the transmission signal, and transforms the signal in the frequency domain into a signal in the time domain. The IFFT-processed signal is output to the CP adding section 411. The CP adding section 411 adds a CP (Cyclic Prefix) to the IFFT-processed transmission signal, and outputs the CP-added transmission signal to the amplifying section 202 as shown in FIG. 12.

Figure 18:
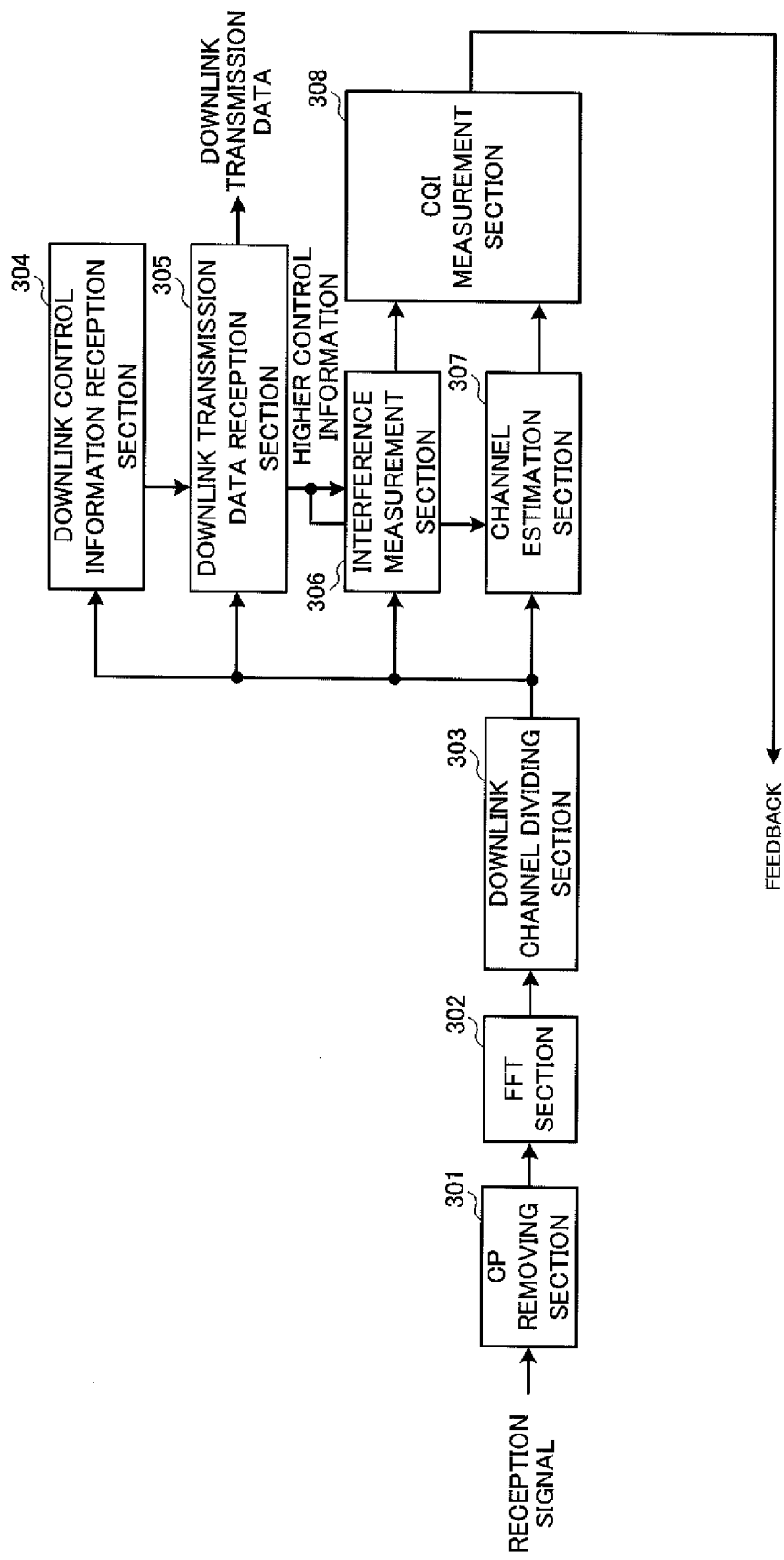
FIG. 18 is a functional block diagram of the mobile terminal apparatus.

Functional blocks of the mobile terminal apparatus associated with interference measurement processing will be described with reference to FIG. 18. In addition, each functional block of FIG. 18 is mainly related to the baseband processing section 104 as shown in FIG. 16. Further, the functional blocks as shown in FIG. 18 are simplified to describe the present invention, and are assumed to have the configuration that the baseband processing section usually has.

On the reception side, the mobile terminal apparatus 10 is provided with a CP removing section 301, FFT section 302, downlink channel dividing section 303, downlink control information reception section 304, downlink transmission data reception section 305, interference measurement section 306, channel estimation section 307, and CQI measurement section 308.

Figure 16:
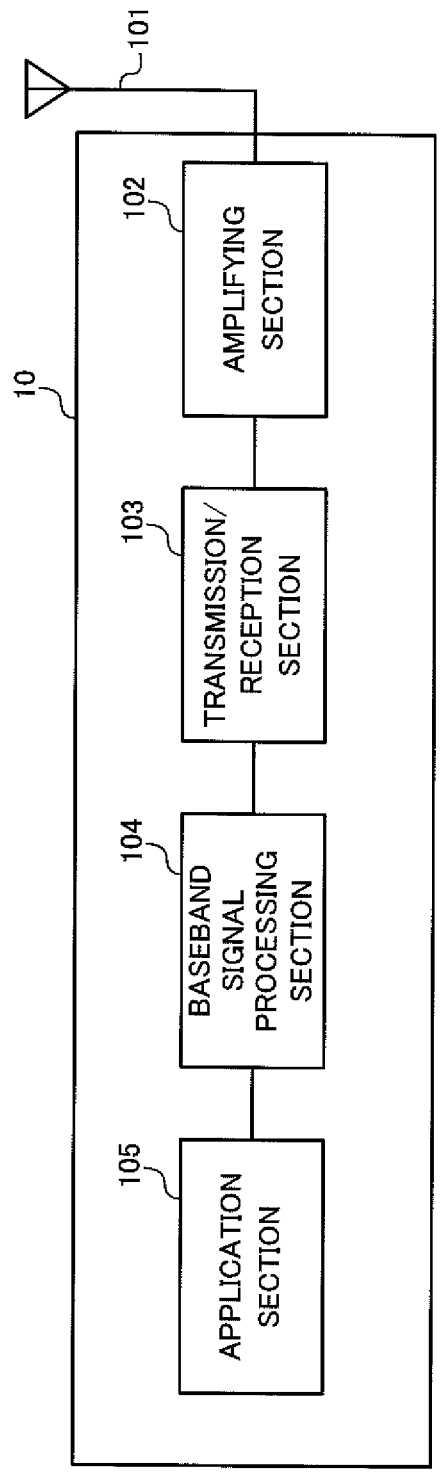
FIG. 16 is an explanatory diagram of an entire configuration of a mobile terminal apparatus.

A transmission signal transmitted from the base station apparatus 20 is received in the transmission/reception antenna 101 as shown in FIG. 16, and is output to the CP removing section 301. The CP removing section 301 removes a CP from the reception signal to output to the FFT section 302. The FFT section 302 performs Fast Fourier Transform (FFT) on the CP-removed signal, and transforms the signal in the time domain into a signal in the frequency domain. The FFT section 302 outputs the signal that is transformed into the signal in the frequency domain to the downlink channel dividing section 303.

The downlink channel dividing section 303 divides the downlink channel signal into downlink control information, downlink transmission data, and CSI-RSs. The downlink channel dividing section 303 outputs the downlink control information to the downlink control information reception section 304, outputs the downlink transmission data and higher control information to the downlink transmission data reception section 305, and further outputs the CSI-RSs to the channel estimation section 307.

The downlink control information reception section 304 demodulates the downlink control information, and outputs the demodulated downlink control information to the downlink transmission data reception section 305. The downlink transmission data reception section 305 demodulates the downlink transmission data using the demodulated downlink control information. At this point, based on pattern assignment information of CSI-RSs included in the higher control information, the downlink transmission data reception section 305 identifies CSI-RS resources, and based on muting information, further identifies muting resources. The downlink transmission data reception section 305 demodulates user data while omitting the CSI-RS resources and muting resources. Further, the downlink transmission data reception section 305 outputs the higher control information included in the downlink transmission data to the interference measurement section 306.

The interference measuring section 306 measures interference received from another transmission point in CSI-RS resources, based on the CSI-RS pattern assignment information included in the higher control information. For example, in the case of being notified of the CSI-RS pattern as shown in FIG. 3 or 5, the section 306 performs interference measurement in each of resources of high-density CSI-RSs. The section 306 measures interference from another transmission point, by subtracting the CSI-RS transmitted from the transmission point of the connection destination from the combined reception signal. Meanwhile, in the case of being notified of the CSI-RS pattern as shown in FIG. 6 or 9, since the additional CSI-RS is of zero power, a signal received in the additional CSI-RS resource is an interference component from another transmission point without any change. The interference measurement section 306 performs interference measurement on all CSI-RS resources including additional CSI-RSs, and averages measurement results in all resource blocks. A result of averaged interference measurement is notified to the CQI measurement section 308.

The channel estimation section 307 identifies CSI-RS resources based on the CSI pattern assignment information included in the higher control information. Then, the section 307 estimates a channel state based on the CSI-RS, and notifies the CSI measurement section 308 of the channel estimation value. The CQI measurement section 308 calculates a CQI based on the interference measurement result notified from the interference measurement section 306, the channel estimation result notified from the channel estimation section 307 and feedback mode. In the case where the CSI-RS pattern as shown in FIG. 3 is applied, since CSI-RSs available for channel state measurement and interference measurement are two times, improved is channel state measurement accuracy and interference measurement accuracy. Even when the additional CSI-RS is of zero power as in the CSI-RS pattern as shown in FIGS. 6 and 9, since CST-RS resources to measure interference are increased, interference measurement accuracy is improved. In addition, the feedback mode may be set for any one of Wideband CQI, Subband CQI and best-M average. The CQI calculated in the CQI measurement section 308 is notified to the base station apparatus 20 as feedback information.

The present invention is not limited to the above-mentioned Embodiment, and is capable of being carried into practice with various modifications thereof. For example, without departing from the scope of the invention, setting positions of CSI-RSs, setting positions of muting, the number of processing sections, processing procedures, the number of CS-RSs, the number of muting, and the number of antennas in the above-mentioned description are capable of being carried into practice with modifications thereof as appropriate. Moreover, the invention is capable of being carried into practice with modifications thereof as appropriate without departing from the scope of the invention.

The present application is based on Japanese Patent Application No. 2011-244010 filed on Nov. 7, 2011, and Japanese Patent Application No. 2012-017279 filed on Jan. 30, 2012, entire contents of which are expressly incorporated by reference herein.

The invention claimed is:

1. A radio communication system comprising:
a plurality of base station apparatuses that transmits a first reference signal for channel state measurement; and
first and second mobile terminal apparatuses that connect to one of the plurality of base station apparatuses, wherein
each of the base station apparatuses is provided with a reference signal assignment section that assigns the first reference signal to a first resource element in a reference signal resource defined for transmission of the first reference signal, while assigning a second reference signal for interference measurement to a second resource element in the reference signal resource, and a notification section that notifies the first mobile terminal apparatus that supports both the first reference signal and the second reference signal of pattern information to identify an assignment pattern of the first reference signal and the second reference signal,
the first mobile terminal apparatus is provided with a reception section that receives notified pattern information, and an interference measurement section that performs interference measurement using both the first reference signal and the second reference signal or only the second reference signal, based on the notified pattern information,
the reference signal assignment section assigns a reference signal for both channel state measurement and interference measurement to the second resource element, as the second reference signal, based on an assignment pattern of the first reference signal that the second mobile terminal apparatus supports, and
the first mobile terminal apparatus performs channel state measurement and interference measurement using the second reference signal.

2. A base station apparatus connected to a plurality of mobile terminal apparatuses, comprising:
a reference signal assignment section that assigns a first reference signal for channel state measurement to a first resource element in a reference signal resource defined for transmission of the first reference signal, while assigning a second reference signal for interference measurement to a second resource element in the reference signal resource; and
a notification section that notifies a first mobile terminal apparatus that supports both the first reference signal and the second reference signal of pattern information to identify an assignment pattern of the first reference signal and the second reference signal,
wherein the reference signal assignment section assigns, as the second reference signal, a reference signal for both channel state measurement and interference measurement to the second resource element, based on an assignment pattern of the first reference signal that a second mobile terminal apparatus supports, and
the first mobile terminal apparatus performs channel state measurement and interference measurement using the second reference signal.

3. A mobile terminal apparatus connected to a base station apparatus, comprising:

a reception section that receives pattern information of a first reference signal for channel state measurement and pattern information to identify an assignment pattern of a second reference signal for interference measurement assigned to a reference signal resource defined for transmission of the first reference signal, transmitted from the base station apparatus; and an interference measurement section that performs interference measurement using both the first reference signal and the second reference signal or only the second reference signal, based on the received pattern information, wherein, as the second reference signal, a reference signal for both channel state measurement and interference measurement is assigned to a resource element in the reference signal resource, based on an assignment pattern of the first reference signal that another mobile terminal apparatus supports, and the mobile terminal apparatus performs channel state measurement and interference measurement using the second reference signal.

4. An interference measurement method comprising:

assigning a first reference signal for channel state measurement to a first resource element in a reference signal resource to transmit the first reference signal, while assigning a second reference signal for interference measurement to a second resource element in the reference signal resource;

notifying a first mobile terminal apparatus that supports both the first reference signal and the second reference signal of pattern information to identify an assignment pattern of the first reference signal and the second reference signal;

in the first mobile terminal apparatus, receiving the pattern information; and performing interference measurement using both the first reference signal and the second reference signal or only the second reference signal, based on the received pattern information, wherein, as the second reference signal, a reference signal for both channel state measurement and interference measurement is assigned to the second resource element, based on an assignment pattern of the first reference signal that a second mobile terminal apparatus supports, and the first mobile terminal apparatus performs channel state measurement and interference measurement using the second reference signal.

5. A radio communication system, comprising:

a plurality of base station apparatuses that transmits a first reference signal for channel state measurement; and first and second mobile terminal apparatuses that connect to one of the plurality of base station apparatuses, wherein each of the base station apparatuses is provided with a reference signal assignment section that assigns the first reference signal to a first resource element in a reference signal resource defined for transmission of the first reference signal, while assigning a second reference signal for interference measurement to a second resource element in the reference signal resource, and a notification section that notifies the first mobile terminal apparatus that supports both the first reference signal and the second reference signal of pattern information to identify an assignment pattern of the first reference signal and the second reference signal, the first mobile terminal apparatus is provided with a reception section that receives notified pattern information, and an interference measurement section that performs interference measurement using both the first reference signal and the second reference signal or only the second reference signal, based on the notified pattern information, the reference signal assignment section assigns, as the second reference signal, a reference signal dedicated to interference measurement to the second resource element, based on an assignment pattern of the first reference signal that the second mobile terminal apparatus supports, and the first mobile terminal apparatus performs interference measurement using the first reference signal and the reference signal dedicated to interference measurement.

6. A base station apparatus connected to a plurality of mobile terminal apparatuses, comprising:

a reference signal assignment section that assigns a first reference signal for channel state measurement to a first resource element in a reference signal resource defined for transmission of the first reference signal, while assigning a second reference signal for interference measurement to a second resource element in the reference signal resource; and a notification section that notifies a first mobile terminal apparatus that supports both the first reference signal and the second reference signal of pattern information to identify an assignment pattern of the first reference signal and the second reference signal, wherein the reference signal assignment section assigns, as the second reference signal, a reference signal dedicated to interference measurement to the second resource element, based on an assignment pattern of the first reference signal that a second mobile terminal apparatus supports, and the first mobile terminal apparatus performs interference measurement using the first reference signal and the reference signal dedicated to interference measurement.

7. A mobile terminal apparatus connected to a base station apparatus, comprising:

a reception section that receives pattern information of a first reference signal for channel state measurement and pattern information to identify an assignment pattern of a second reference signal for interference measurement assigned to a reference signal resource defined for transmission of the first reference signal, transmitted from the base station apparatus; and an interference measurement section that performs interference measurement using both the first reference signal and the second reference signal or only the second reference signal, based on the received pattern information, wherein, as the second reference signal, a reference signal dedicated to interference measurement is assigned to a resource element in the reference signal resource, based on an assignment pattern of the first reference signal that another mobile terminal apparatus supports, and the mobile terminal apparatus performs interference measurement using the first reference signal and the reference signal dedicated to interference measurement.

8. An interference measurement method comprising:

assigning a first reference signal for channel state measurement to a first resource element in a reference signal resource to transmit the first reference signal, while assigning a second reference signal for interference measurement to a second resource element in the reference signal resource;

notifying a first mobile terminal apparatus that supports both the first reference signal and the second reference signal of pattern information to identify an assignment pattern of the first reference signal and the second reference signal;

in the first mobile terminal apparatus,
  receiving the pattern information; and
  performing interference measurement using both the first reference signal and the second reference signal or only the second reference signal, based on the received pattern information, wherein, as the second reference signal, a reference signal dedicated to interference measurement is assigned to the second resource element based on an assignment pattern of the first reference signal that a second mobile terminal apparatus supports, and the first mobile terminal apparatus performs interference measurement using the first reference signal and the reference signal dedicated to interference measurement.

* * * * *